(12) United States Patent
Lee et al.

(10) Patent No.: US 8,549,258 B2
(45) Date of Patent: Oct. 1, 2013

(54) CONFIGURABLE PROCESSING APPARATUS AND SYSTEM THEREOF

(75) Inventors: Tzu-Fang Lee, Hsinchu (TW); Chien-Hong Lin, Hsinchu County (TW); Jing-Shan Liang, Taipei (TW); Chi-Lung Wang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 776 days.

(21) Appl. No.: 12/701,594

(22) Filed: Feb. 7, 2010

(65) Prior Publication Data

US 2011/0072242 A1 Mar. 24, 2011

(30) Foreign Application Priority Data

Sep. 24, 2009 (TW) ................................ 98132337 A

(51) Int. Cl.
*G06F 15/80* (2006.01)
(52) U.S. Cl.
USPC ................................ 712/15; 712/16; 712/220
(58) Field of Classification Search
USPC ................. 712/11, 15, 16, 20, 205, 214, 215, 712/216, 219, 220
See application file for complete search history.

(56) References Cited

U.S. PATENT DOCUMENTS

| | | | |
|---|---|---|---|
| 5,212,777 A | 5/1993 | Gove et al. | |
| 5,475,856 A | 12/1995 | Kogge | |
| 5,966,528 A | 10/1999 | Wilkinson et al. | |
| 6,047,367 A * | 4/2000 | Heller, Jr. | 712/23 |
| 6,052,771 A * | 4/2000 | Heller et al. | 712/34 |
| 6,272,616 B1 | 8/2001 | Fernando et al. | |
| 6,366,998 B1 | 4/2002 | Mohamed | |
| 6,370,558 B1 | 4/2002 | Guttag et al. | |
| 6,487,651 B1 | 11/2002 | Jackson et al. | |
| 6,801,984 B2 * | 10/2004 | Arimilli et al. | 711/146 |
| 6,874,078 B2 | 3/2005 | Pechanek et al. | |
| 6,993,641 B2 * | 1/2006 | Wong et al. | 712/219 |
| 7,376,812 B1 | 5/2008 | Sanghavi et al. | |
| 7,409,530 B2 | 8/2008 | Kim et al. | |
| 7,539,847 B2 * | 5/2009 | Kashiwagi | 712/34 |
| 8,151,090 B2 * | 4/2012 | Park et al. | 712/16 |
| 2002/0120831 A1 | 8/2002 | Wong et al. | |

FOREIGN PATENT DOCUMENTS

| | | | |
|---|---|---|---|
| TW | 200500853 | 1/2005 | |
| WO | WO 2009153703 A1 * | 12/2009 | G06F 12/08 |

OTHER PUBLICATIONS

Office Action of Taiwan counterpart application issued on May 10, 2013, p. 1-p. 3.

* cited by examiner

*Primary Examiner* — Aimee Li
(74) *Attorney, Agent, or Firm* — Jianq Chyun IP Office

(57) ABSTRACT

A configurable processing apparatus includes a plurality of processing units, at least an instruction synchronization control circuit, and at least a configuration memory. Each processing apparatus has a stall-output signal generating circuit to output a stall-output signal, wherein the stall-output signal indicates that an unexpected stall is occurred in the processing unit. The processing unit has a stall-in signal, and an external circuit of the processing unit can control whether the processing unit is stalled according to the stall-in signal. The instruction synchronization control circuit generates the stall-in signals to the processing units in response to a content stored in the configuration memory and the stall-output signals of the processing units, so as to determine operation modes and instruction synchronization of the processing units.

21 Claims, 30 Drawing Sheets

| Address | Instruction Content |
|---------|---------------------|
| | 145 |
| 41x00 | Add r5,Ø3 → 141 |
| 41x02 | Add r6,r5 → 142 |
| 41x04 | And r7,r5 → 143 |
| 41x06 | Or r4,r2 ⇢ 141 |
| 41x08 | Sub r4,r5 ⇢ 142 |
| 41x0A | Or r9,r7 ⇢ 143 |
| ... | ... |

FIG. 2B (RELATED ART)

|  | Ld r5,@x3 | Sub r6,r5 | And r8,r5 | Or r9,r5 |
|---|---|---|---|---|
| t1 | Instruction fetch | | | |
| t2 | Instruction decode | Instruction fetch | | |
| t3 | Instruction execution | Instruction decode | Instruction fetch | |
| t4 | Data access | Instruction execution | Instruction decode | Instruction fetch |
| t5 | Write back | Instruction execution | Instruction decode | Instruction fetch |
| t6 | | Data access | Instruction execution | Instruction decode |
| t7 | | Write back | Data access | Instruction execution |
| t8 | | | Write back | Data access |
| t9 | | | | Write back |

| | Add r5,r4 | Sub r6,r4 |
|---|---|---|
| t1 | Instruction fetch | |
| t2 | Instruction fetch | |
| t3 | Instruction fetch | Instruction fetch |
| t4 | Instruction decode | Instruction decode |
| t5 | Instruction execution | Instruction execution |
| t6 | Data access | Data access |
| t7 | Write back | Write back |
| t8 | | |

FIG. 4B (RELATED ART)

| | Ld r5,@x3 | Sub r6,r4 |
|---|---|---|
| t1 | Instruction fetch | |
| t2 | Instruction decode | Instruction fetch |
| t3 | Instruction execution | Instruction decode |
| t4 | Data access | Instruction execution |
| t5 | Data access | Instruction execution |
| t6 | Data access | Instruction execution |
| t7 | Write back | Data access |
| t8 | | Write back |

| | PU1 | | PU2 | |
|---|---|---|---|---|
| | Ld r5,@x3 | And r5,r7 / Add r8,r6 | mov r2,r1 | And r3,r1 / Add r1,r2 |
| t1 | Instruction fetch | | | |
| t2 | Instruction decode | Instruction fetch | | |
| t3 | Instruction execution | Instruction decode / Instruction fetch | Instruction fetch | |
| t4 | Data access | Instruction execution / Instruction decode | Instruction decode | |
| t5 | Write back | Instruction execution / Instruction decode | Instruction execution | Instruction fetch |
| t6 | | Data access / Instruction execution | Data access | Instruction decode |
| t7 | | Write back / Data access | Write back | Instruction decode / Data access |
| t8 | | Write back | | Instruction execution / Write back |

FIG. 5D

| Address | Instruction Content |
|---|---|
| FAx0A | Add r5,13 |
| FAx0C | Add r6,r5 |
| FAx0E | And r7,r5 |
| FAx10 | Or r4,r2 |
| FAx12 | Sub r4,r5 |
| FAx14 | Or r9,r7 |
| ... | ... |

CONFIGURABLE PROCESSING APPARATUS AND SYSTEM THEREOF

CROSS-REFERENCE TO RELATED APPLICATION

This application claims the priority benefit of Taiwan application serial no. 98132337, filed on Sep. 24, 2009. The entirety of the above-mentioned patent application is hereby incorporated by reference herein and made a part of specification.

BACKGROUND

1. Technical Field

The present disclosure relates to a processing apparatus of an electronic product. More particularly, the present disclosure relates to a configurable processing apparatus having a plurality of processing units (which is referred to as PU), and a system thereof.

2. Description of Related Art

Presently, computers or other high-class electronic products all have central processors. The central processor is a processing apparatus used for processing data and executing instructions. With development of fabrication techniques, the processing apparatus are miniaturized, and in a single processing apparatus, a plurality of processing units can be configured to simultaneously process data and execute instructions, for example, a dual-core or a quad-core central processing unit provided by Intel Corporation.

Referring to FIG. 1A, FIG. 1A is a system block diagram of a conventional processing apparatus 10. The processing apparatus 10 uses a single instruction single data (SISD) structure. As shown in FIG. 1A, the processing apparatus 10 has a processing unit 101, a data buffer 102 and an instruction buffer 103. During each cycle, the processing apparatus 10 fetches one batch of data from a plurality of data stored in the data buffer 102 to the processing unit 101, and fetches one instruction from a plurality of instructions stored in the instruction buffer 103 to the processing unit 101. The processing unit 101 executes the received instruction and processes the received data according to the received instruction.

Referring to FIG. 1B, FIG. 1B is a system block diagram of a conventional processing apparatus 11. The processing apparatus 11 uses a multiple instructions single data (MISD) structure. As shown in FIG. 1B, the processing apparatus 11 has a plurality of processing units 111 and 112, a data buffer 113 and an instruction buffer 114. During each cycle, the processing apparatus 11 fetches one batch of data from a plurality of data stored in the data buffer 113 to the processing units 111 and 112, and fetches multiple instructions from a plurality of instructions stored in the instruction buffer 114 to the processing units 111 and 112. The processing units 111 and 112 respectively execute the received instructions, and process the received data according to the received instructions. The processing apparatus 11 of such MISD structure can respectively process the same data according to multiple instructions during each cycle.

Referring to FIG. 1C, FIG. 1C is a system block diagram of a conventional processing apparatus 12. The processing apparatus 12 uses an SIMD structure. As shown in FIG. 1C, the processing apparatus 12 has a plurality of processing units 121, 122 and 123, a data buffer 124 and an instruction buffer 125. During each cycle, the processing apparatus 12 fetches multiple data from a plurality of data stored in the data buffer 124 to the processing units 121-123, and fetches one instruction from a plurality of instructions stored in the instruction buffer 125 to the processing units 121-123. The processing units 121-123 respectively execute the received instruction, and process the received data according to the received instruction.

Referring to FIG. 1D, FIG. 1D is a system block diagram of a conventional processing apparatus 13. The processing apparatus 13 uses an MIMD structure. As shown in FIG. 1D, the processing apparatus 13 has a plurality of processing units 131-134, a data buffer 137 and an instruction buffer 138. During each cycle, the processing apparatus 13 fetches multiple data from a plurality of data stored in the data buffer 137 to the processing units 131-134, and fetches multiple instructions from a plurality of instructions stored in the instruction buffer 138 to the processing units 131-134.

Referring to FIG. 2A, FIG. 2A is a system block diagram of a conventional processing apparatus 14. The processing apparatus 14 uses a very long instruction word (VLIW) structure. The processing apparatus 14 has a plurality of processing units 141, 142 and 143, a data buffer 144, an instruction buffer 145 and a shared resource buffer 146. A length of an instruction word executed by the processing apparatus 14 of the VLIW structure is relatively long, and the instruction word (containing a plurality of instructions) can be processed during one cycle.

Referring to FIG. 2B, FIG. 2B is a schematic diagram illustrating instructions stored in the instruction buffer 145. The processing apparatus 14 of the VLIW structure fetches instructions from the instruction buffer 145. The instructions stored in the instruction buffer 145 are codes of the assembly language or codes of other type of machine codes generated via software compiling. During a first cycle, the instructions corresponding to addresses 41x00-41x04 in the instruction buffer 145 are read out as one instruction word, and the processing units 141-143 respectively receive the instructions in the instruction word, i.e. respectively receive the instructions of the addresses 41x00-41x04. Then, the processing units 141-143 respectively process the received instructions (the instructions of the addresses 41x00-41x04). In detail, the processing unit 141 adds the contents of registers r5 and l3 (r5 is a global register in the shared resource buffer 146, and l3 is a local register in the processing unit 141), and stores an adding result in the register r5. The processing unit 142 adds the contents of the registers r6 and r5, and stores an adding result in the register r6 of the shared resource buffer 146. The processing unit 143 performs a logic AND operation to the contents of the registers r7 and r8, and stores an operation result in the register r7 of the shared resource buffer 146.

Thereafter, during a second cycle, the instructions corresponding to addresses 41x06-41x0A in the instruction buffer 145 are read out as one instruction word, and the processing units 141-143 respectively receive the instructions in the instruction word, i.e. respectively receive the instructions of the addresses 41x06-41x0A. Then, the processing units 141-143 respectively process the received instructions (the instructions of the addresses 41x06-41x0A). In detail, the processing unit 141 performs a logic OR operation to the contents of the registers r1 and r2, and stores an operation result in the register r1 of the shared resource buffer 146. The processing unit 142 performs a subtraction operation to the contents of the registers r4 and r5, and stores an operation result in the register r4. The processing unit 143 performs a logic OR operation to the contents of the registers r9 and r7, and stores an operation result in the register r9.

It should be noticed that during the first cycle, the content of the register r5 is renewed, and during the second cycle, the processing unit 142 obtains the renewed content of the register r5 through the shared resource buffer 146. Therefore, the shared resource buffer 146 can share the renewed content to each of the processing units 141-143.

In an image processing system, if the processing apparatus using the VLIW or the SIMD structure is applied, a plenty of time is saved. However, regarding a file processing program, the processing apparatus using the VLIW or the SIMD structure probably cannot achieve the above advantage. Therefore, if a configuration of the processing apparatus can be changed according to different demands, a performance of the processing apparatus can be improved.

A situation that an unexpected stall is occurred to the processing unit is described below. Referring to FIG. 3, FIG. 3 is a schematic diagram illustrating a situation that the processing unit is stalled due to a data hazard. In this example, the processing unit has a pipeline structure, and pipeline stages thereof are sequentially five stages of instruction fetch, instruction decode, instruction execution, data access and write back. The shared resource registers r0-r15 have a hazard detecting circuit for detecting occurrence of a hazard and controlling stall of a suitable pipeline stage. Moreover, the processing unit has a forwarding circuit for forwarding data to the forward pipeline stages, so that a renewed data can be used by other instructions before it is written to the register.

During a time cycle t1, an instruction Ld r5, @x3 is fetched. During a time cycle t2, an instruction Sub r6, r4 is fetched, and meanwhile the instruction Ld r5, @x3 is decoded. During a time cycle t3, the instruction Ld r5, @x3 is in the instruction execution pipeline stage, and meanwhile an instruction And r7, r5 is fetched, and the instruction Sub r6, r4 is decoded. During a time cycle t4, data of the address @x3 is read into the processing unit, and the data is written into the register r5 during a time cycle t5. In this example, a programmer or a compiler expects a content of the register r5 used by the instruction Sub r6, r5 is a new data read from the address @x3 by the instruction Ld r5, @x3, and now the hazard detecting circuit detects an occurrence of the hazard. Therefore, during the time cycle t4, the instruction Sub r6, r5 stalls the instruction execution pipeline stage until the data of the memory address @x3 is read into the processing unit during the time cycle t5. During the time cycle t5, the data of the memory address @x3 is directly forwarded to the instruction Sub r6, r5 in the instruction execution pipeline stage through the forwarding circuit before being written into the register r5, so that the instruction execution can be immediately performed. Moreover, during the time cycle t4 when the execution stall is occurred, the instructions And r8, r5 and Or r9, r5 respectively in the instruction decode and the instruction fetch pipeline stages have to be simultaneously stalled.

Next, referring to FIG. 4A and FIG. 4B, FIG. 4A and FIG. 4B are schematic diagrams respectively illustrating an instruction fetch stall and a data access stall occurred in the processing unit. In the example of FIG. 4A, during the time cycle t1, since the data is not ready when the processing unit fetches the instruction, during the time cycles t1 and t2, the instruction fetch pipeline stage of the processing unit is stalled to wait the instruction data entering the processing unit. During the time cycle t3, the instruction data successfully enters the processing unit. Then the processing unit can successfully perform the instruction decode during the time cycle t4, and a next instruction can enter the instruction fetch pipeline stage of the processing unit. In an example of FIG. 4B, during the time cycles t4 and t5, the data is not ready when the processing unit read the data of the memory address @x3, so that during the time cycles t4 and t5, the data access pipeline stage of the processing unit is stalled, and the forward pipeline stage is also stalled, for example, the instruction Sub r6, r4 is also stalled at the instruction execution pipeline stage until the data of the address @x3 is successfully read into the processing unit during the time cycle t6, and then executions of the pipeline stages are carried on.

SUMMARY

The present disclosure is directed to a configurable processing apparatus, and the configurable processing apparatus generates multiple stall-in signals to processing units in response to a content stored in a configuration memory and stall-output signals of the processing units, so as to determine operation modes and instruction synchronization of the processing units.

The present disclosure provides a configurable processing apparatus including a plurality of processing units, at least an instruction synchronization control circuit, and at least a configuration memory. Each processing unit has a stall-output signal generating circuit to output a stall-output signal, wherein the stall-output signal indicates that an unexpected stall is occurred in the processing unit. The processing unit further receives at least a stall-in signal, and an external circuit of the processing unit controls whether the processing unit is stalled according to the stall-in signal. The instruction synchronization control circuit generates the stall-in signals to the processing units in response to a content stored in the configuration memory and the stall-output signals of the processing units, so as to determine operation modes and instruction synchronization of the processing units.

According to the above description, in the present disclosure, the instruction synchronization control circuit determines how to process the stall-output signals and the stall-in signals of the processing units according to the data stored in the configuration memory, so that the processing units in a same group can synchronously execute the instructions to obtain correct execution results, and the processing unit that is not belonged to any group can independently execute the instruction. Moreover, the processing units in the same group can also determine whether a processing unit can share the instructions fetched by other processing units in the group according to the data stored in the configuration memory, wherein an instruction sharing configuration is analogous to a single instruction multiple data (SIMD) mode, and an instruction un-sharing configuration is analogous to a very long instruction word (VLIW) mode. Therefore, the configurable processing apparatus has a flexible execution mode, in which the content of the configuration memory can be dynamically changed, so as to achieve an optimal efficiency in case of different application programs.

In order to make the aforementioned and other features and advantages of the present disclosure comprehensible, several exemplary embodiments accompanied with figures are described in detail below.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain the principles of the present disclosure.

FIG. 2B is a schematic diagram illustrating instructions stored in an instruction buffer 145.

FIG. 3 is a schematic diagram illustrating a situation that a processing unit is stalled due to a data hazard.

FIG. 4A and FIG. 4B are schematic diagrams respectively illustrating an instruction fetch stall and a data access stall occurred in a processing unit.

FIG. 5D is another schematic diagram illustrating two processing units PU1 and PU2 of a same group having unexpected stalls.

FIG. 8D is a schematic diagram illustrating instructions contained in an instruction block 253 of FIG. 8C.

FIG. 10C is another schematic diagram illustrating a situation that a pipeline processing apparatus processes an unexpected stall.

FIG. 10D is another schematic diagram illustrating a situation that a pipeline processing apparatus processes an unexpected stall.

DESCRIPTION OF THE EMBODIMENTS

Embodiments of the present disclosure provide a plurality of configurable processing apparatus, and a plurality of processing units in the configurable processing apparatus can be grouped into groups of a very long instruction word (VLIW) mode or a single instruction multiple data (SIMD) mode according to data stored in a configuration memory, and the ungrouped processing units can be independently operated to sever as independent single instruction single data (SISD) or multiple instruction multiple data (MIMD) structures. Therefore, these configurable processing apparatus may simultaneously have the VLIW or SIMD structure and the independent SISD or MIMD structure to satisfy demands of different programs, so that an instruction executing performance and a data processing speed thereof are increased.

To deal with a problem of instruction un-synchronization caused by unexpected stalls, the configurable processing apparatus has an instruction synchronization control circuit. The instruction synchronization control circuit can receive a plurality of stall-output signals from the processing units, and can generate stall-in signals to the processing units in response to a setting of the configuration memory and the stall-output signals. Wherein, the stall-output signals can be generated by the processing units or generated by devices other than the processing units, and the stall-output signal indicates that an unexpected stall is occurred in the corresponding device or the processing unit. Moreover, the stall-in signal is used for notifying that the corresponding processing unit has to be stalled, so as to achieve instruction synchronization of the processing units in the same group, and accordingly execution of the instruction can obtain a correct result.

Figure 1A:
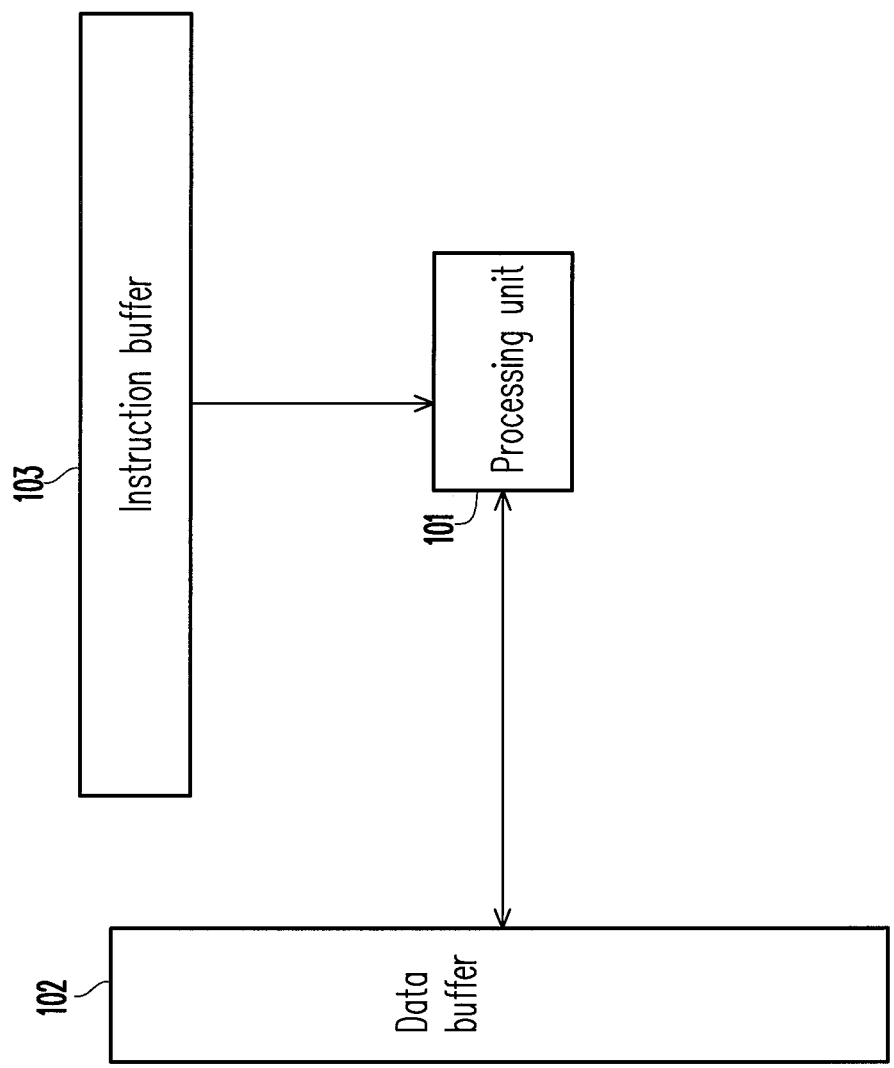
FIG. 1A is a system block diagram of a conventional processing apparatus 10, wherein the processing apparatus 10 uses an SISD structure.
Figure 1B:
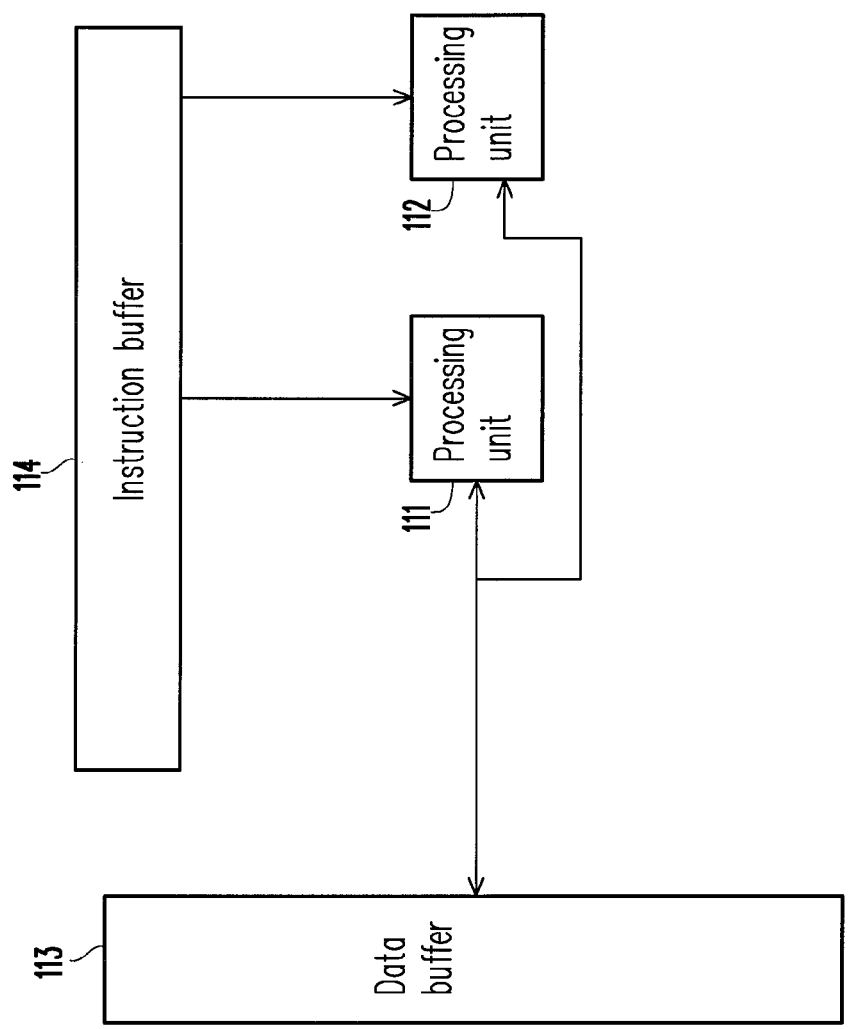
FIG. 1B is a system block diagram of a conventional processing apparatus 11, wherein the processing apparatus 11 uses an MISD structure.
Figure 1C:
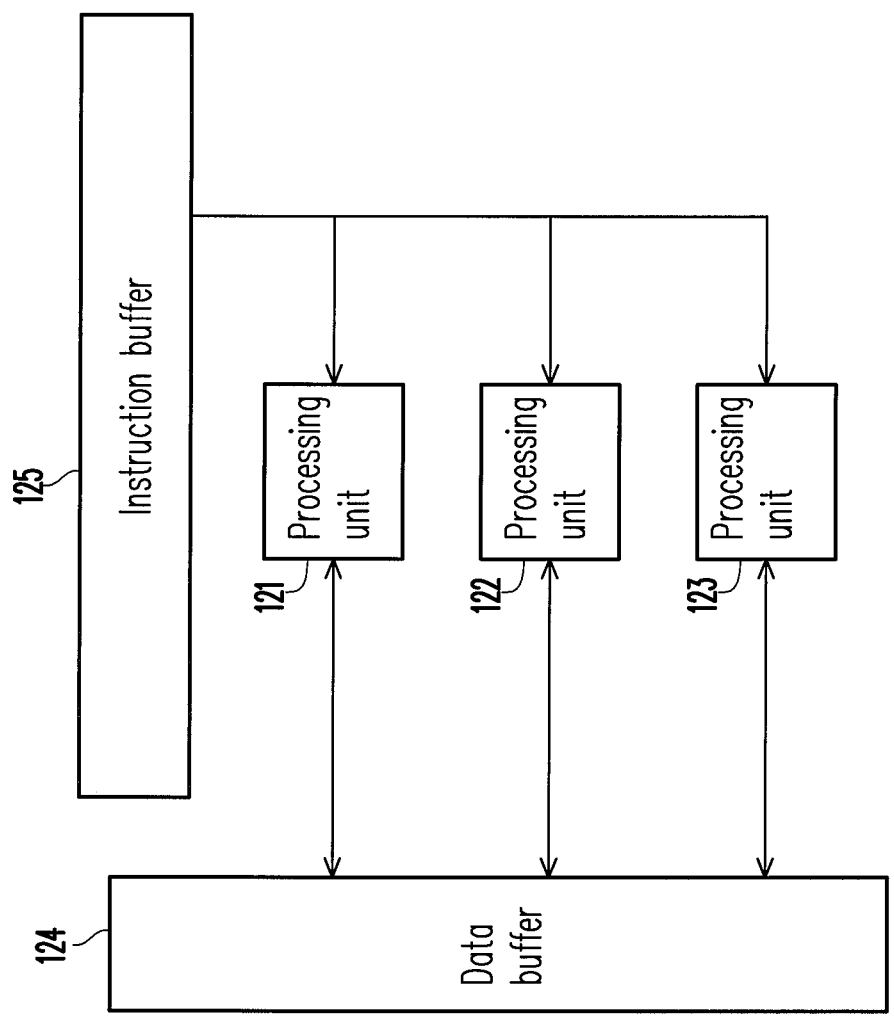
FIG. 1C is a system block diagram of a conventional processing apparatus 12, wherein the processing apparatus 12 uses an SIMD structure.
Figure 1D:
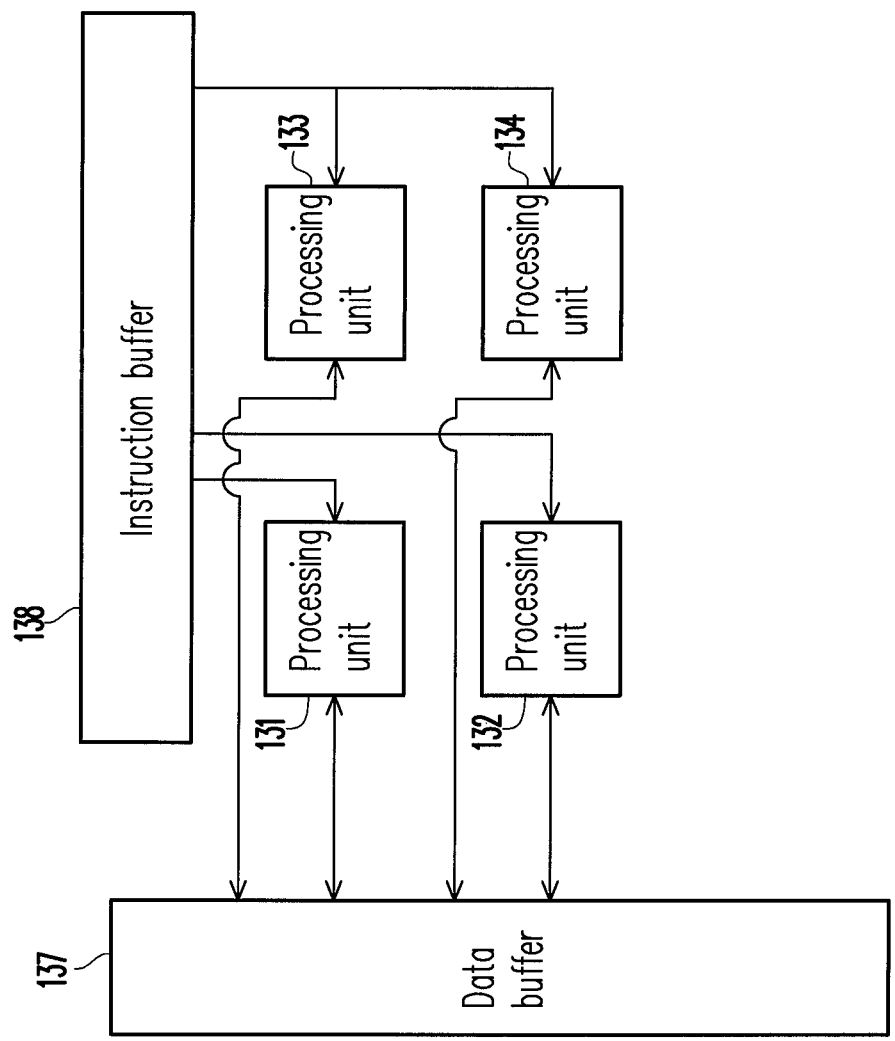
FIG. 1D is a system block diagram of a conventional processing apparatus 13, wherein the processing apparatus 13 uses an MIMD structure.
Figure 2A:
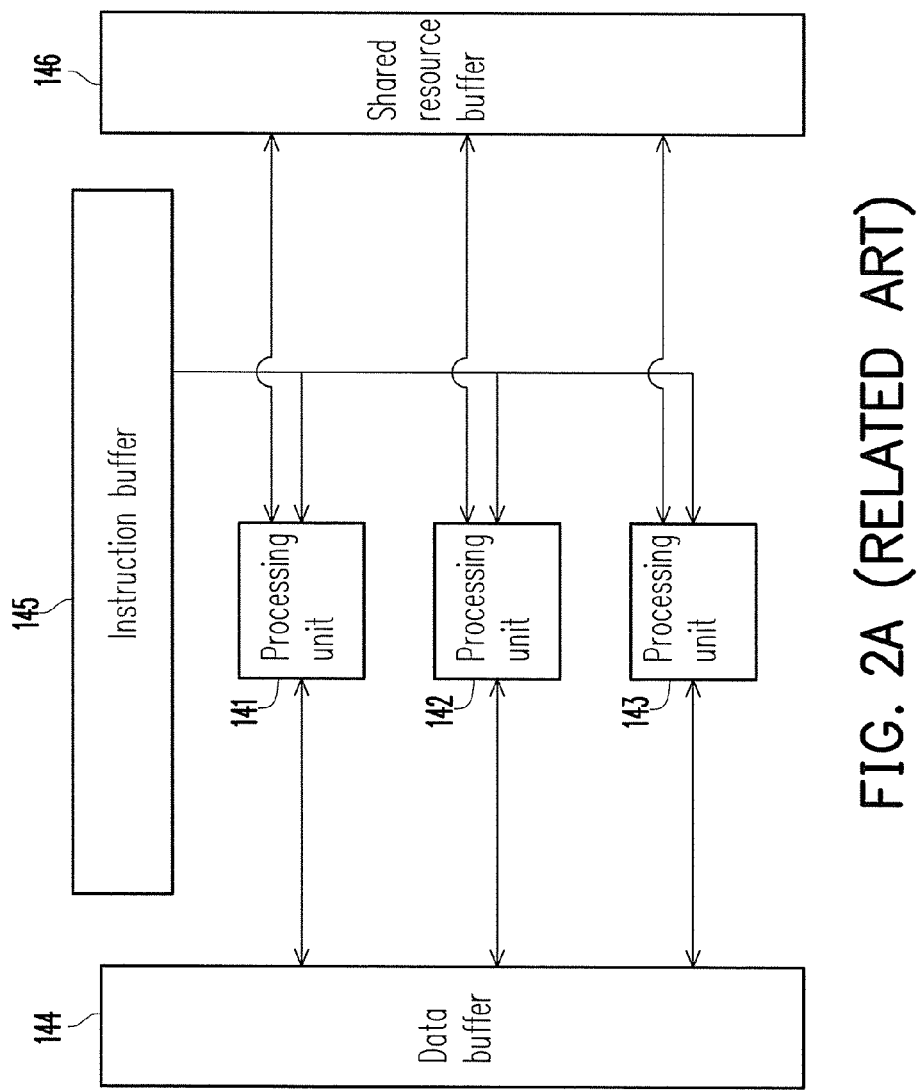
FIG. 2A is a system block diagram of a conventional processing apparatus 14, wherein the processing apparatus 14 uses a VLIW structure.
Figure 5A:
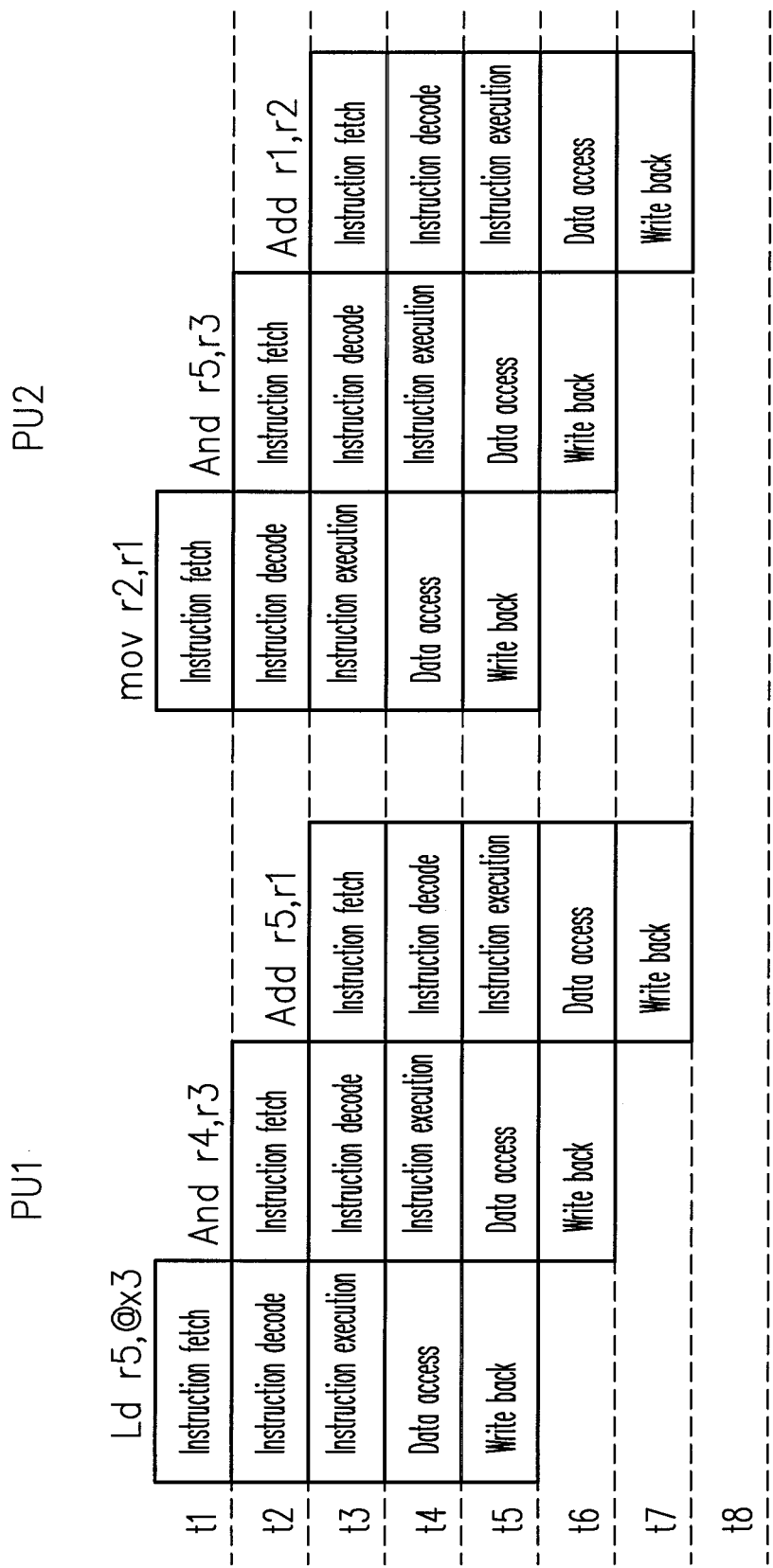
FIG. 5A is a schematic diagram illustrating two processing units PU1 and PU2 of a same group without unexpected stalls.

Implementation of the instruction synchronization of the processing units is described below. Referring to FIG. 5A, FIG. 5A is a schematic diagram illustrating two processing units PU1 and PU2 of a same group without unexpected stalls. The processing units PU1 and PU2 all have a pipeline structure, and pipeline stages thereof are sequentially five stages of instruction fetch, instruction decode, instruction execution, data access and write back. In FIG. 5A, the processing unit PU1 fetches an instruction Ld r5, @x3 during a time cycle t1, and the instruction Ld r5, @x3 can read data from the memory address @x3 only when a time cycle t4 is ended, and during a time cycle t5, the read data is written into the register r5. The processing unit PU2 fetches an instruction Add r5, r7 during a time cycle t2, and the instruction Add r5, r7 obtains data of the registers r7 and r5 during the time cycle t4, and then the two values are added and an adding result thereof is stored in the register r5.

However, in FIG. 5A, if the shared resource registers r0-r15 of the processing units PU1 and PU2 do not have a hazard detecting circuit, and regarding the instruction Add r5, r7 executed by the processing unit PU2, data of the register r5 expected by a programmer or a compile is an old data of the register r5, i.e. the old data of the register r5 before the instruction Ld r5, @x3 of the processing unit PU1 read the content of the address @x3 in the memory, in this case, the instruction Add r5, r7 can be immediately executed, so that the unexpected stall is not occurred to the processing units PU1 and PU2.

Figure 5B:
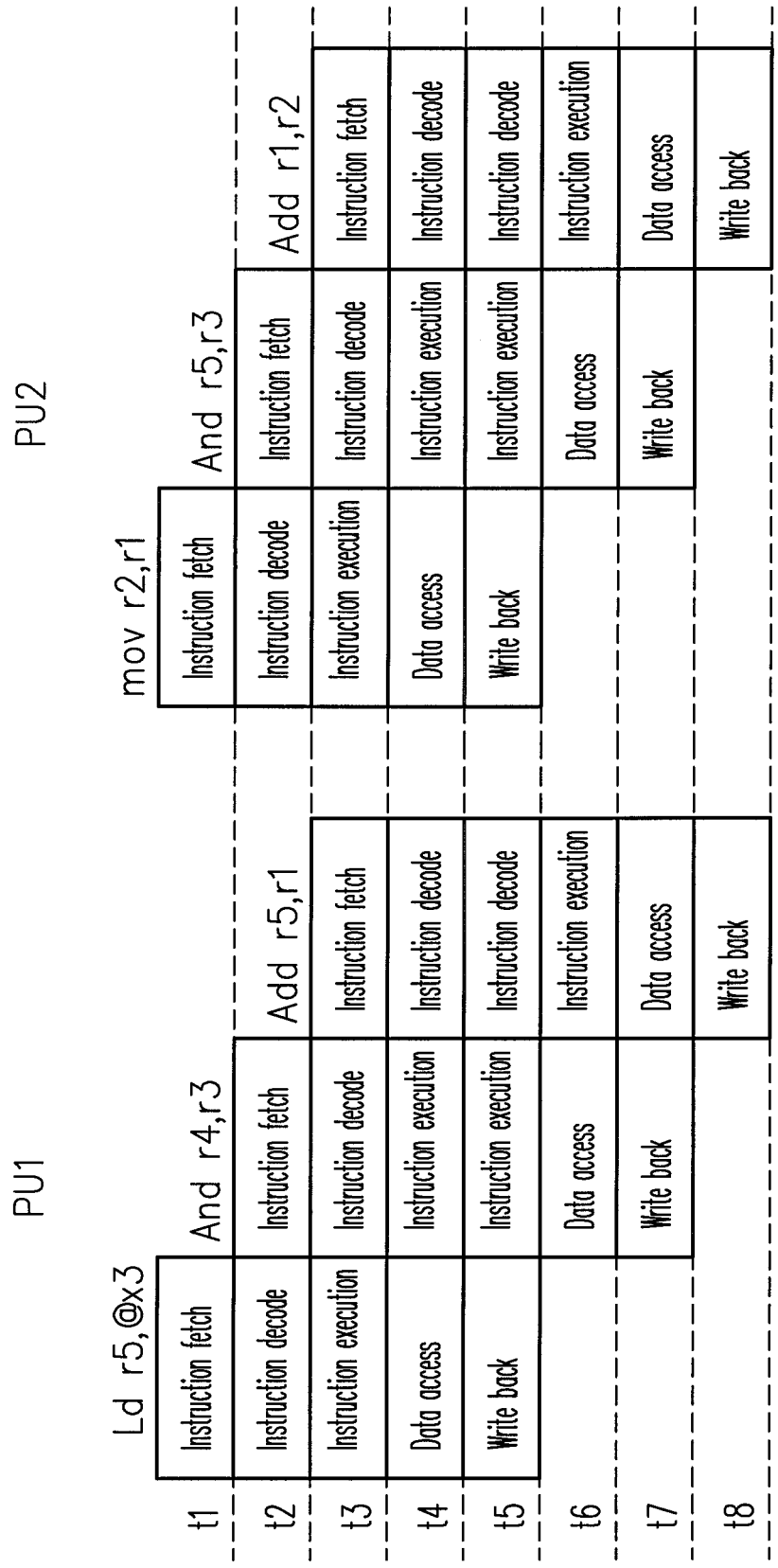
FIG. 5B is a schematic diagram illustrating two processing units PU1 and PU2 of a same group having unexpected stalls.

Conversely, in FIG. 5B, if the shared resource registers r0-r15 of the processing units PU1 and PU2 have a hazard detecting circuit for detecting occurrence of hazard and controlling a suitable pipeline stage stall, and have a forwarding circuit for forwarding result data to the forward pipeline stages, so that the renewed data can be used by other instructions before it is written to the register, when the processing unit PU2 executes the instruction Add r5, r7, the data of the register r5 expected by the programmer or the compiler is the new data of the register r5, i.e. the required data is the content of the address @x3 in the memory that is read by the processing unit PU1 and is about to be written into the register r5. Now, a data hazard is occurred, so that before the processing unit PU2 obtains the data stored in the register r5 or obtain the new data of the register r5 through the forwarding circuit, the pipeline stages of the instruction execution and the previous instruction decode and instruction fetch have to be stalled. The hazard detecting circuit of the shared resource registers notifies the processing unit PU2 occurrence of the hazard, and the processing unit PU2 sends a stall signal of the instruction execution pipeline stage to notify all of the processing units PU1 and PU2 that are required to be synchronous to stall the instruction execution pipeline stages and the previous instruction decode and instruction fetch pipeline stages. Otherwise, if the processing unit PU2 executes the instruction Add r5, r7 before the new data of the register r5 is obtained, an execution result thereof is inconsistent to a value expected by the programmer or the compiler.

Figure 5C:
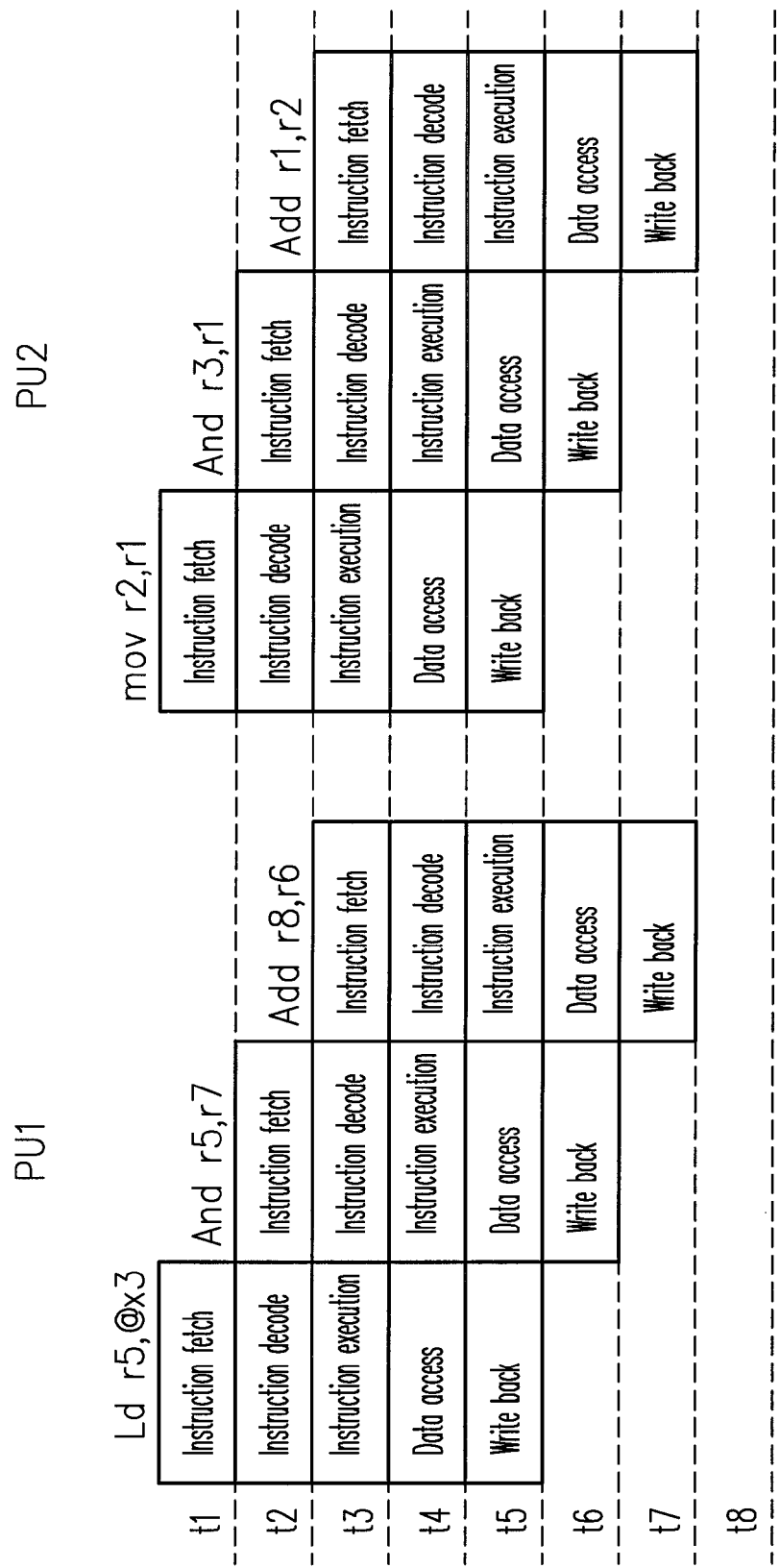
FIG. 5C is another schematic diagram illustrating two processing units PU1 and PU2 of a same group without unexpected stalls.

Similarly, as shown in FIG. 5C, if the registers r0-r15 used by the processing unit PU1 do not have the hazard detecting circuit and the forwarding circuit, and regarding the instruction Add r5, r7 executed by the processing unit PU1, the data of the register r5 expected by the programmer or the compiler is the old data of the register r5, i.e. the old data of the register r5 before the instruction Ld r5, @x3 of the processing unit PU1 read the content of the address @x3 in the memory, in this case, the instruction Add r5, r7 can be immediately executed, so that the unexpected stall is not occurred to the processing units PU1 and PU2.

Next, referring to FIG. 5D, if the registers r0-r15 used by the processing units PU1 and PU2 have the hazard detecting circuit and the forwarding circuit, when the processing unit PU1 executes the instruction Add r5, r7, the data of the register r5 expected by the programmer or the compiler is the new data of the register r5, i.e. the required data is the content of the address @x3 in the memory that is read by the processing unit PU1 and is about to be written into the register r5. Now, before the processing unit PU1 obtains the data stored in the register r5 or obtain the new data of the register r5 through the forwarding circuit, the pipeline stages of the instruction execution and the previous instruction decode and instruction fetch have to be stalled. The hazard detecting circuit of the shared resource register notifies the processing unit PU1 occurrence of the hazard, and the processing unit PU1 sends a stall signal of the instruction execution pipeline stage to notify all of the processing units PU1 and PU2 that are required to be synchronous to stall the instruction execution pipeline stages and the previous instruction decode and instruction fetch pipeline stages. In this example, although the processing unit PU2 is not involved in a data hazard, the instruction execution pipeline stage and the previous instruction decode and instruction fetch pipeline stages are still stalled to maintain a sequence consistency of all of the instructions, so as to maintain a dependency of the processed data and a consistency between a result and a value expected by the programmer or the compiler. Otherwise, subsequent instruction synchronization is influenced, and an execution sequence, behaviour and results of the whole program that are expected by the programmer and the compiler are spoiled.

Figure 6A:
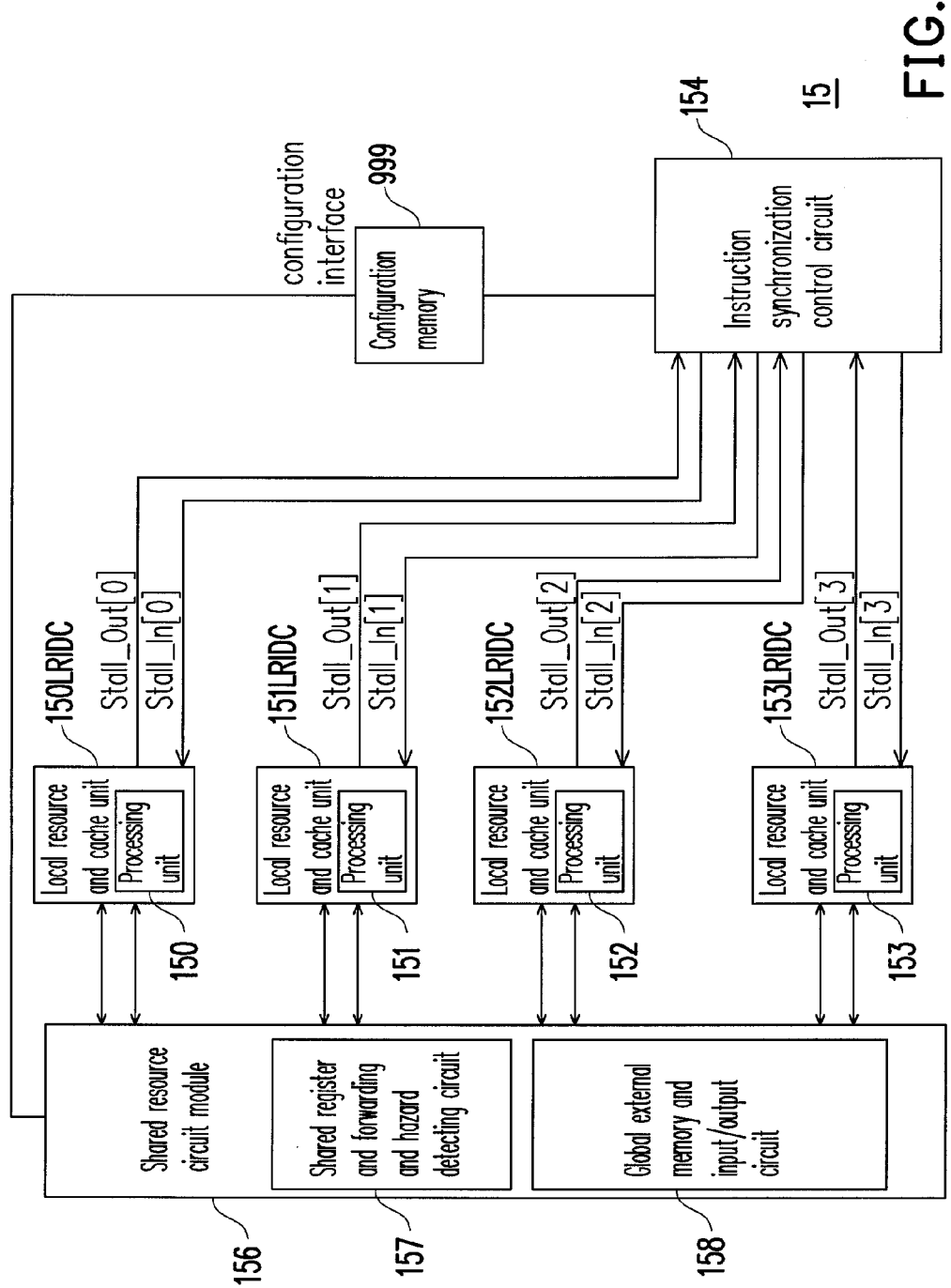
FIG. 6A is a system block diagram of a configurable processing apparatus 15 according to an exemplary embodiment of the present disclosure.

Referring to FIG. 6A, FIG. 6A is a system block diagram of a configurable processing apparatus 15 according to an exemplary embodiment of the present disclosure. The configurable processing apparatus 15 includes processing units 150-153, an instruction synchronization control circuit 154, a configuration memory 999 and a shared resource circuit module 156. Wherein, the processing units 150-153 can access their unique local resource and cache units 150LRIDC-153LRIDC, and the processing units 150-153 can also access the shared resource circuit module 156, which includes a shared register and forwarding and hazard detecting circuit 157, and a global external memory and input/output circuit 158. The processing units 150-153 are all coupled to the instruction synchronization control circuit 154 and the shared resource circuit module 156. Instructions and data of the processing units 150-153 come from the shared resource circuit module 156 or the local resource and cache units 150LRIDC-153LRIDC. A content stored in the configuration memory 999 records a setting mode of the instruction synchronization of the processing units, wherein an initial value thereof can be set by a user, or the setting value thereof can be dynamically changed by internal circuits (including the processing units) of the configurable processing apparatus 15, so as to determine the setting mode of the instruction synchronization of the processing units. The instruction synchronization control circuit 154 can generate a plurality of stall-in signals Stall_In[0]-Stall_In[3] to the processing units 150-153 in response to the content stored in the configuration memory 999 and the stall-output signals of the processing units 150-153, so that the configurable processing apparatus 15 can control the processing units 150-153 according to the stall-in signals Stall_In[0]-Stall_In[3], and therefore the configurable processing apparatus 15 may have multiple operation modes. Moreover, the configuration memory 999 may have another part of data setting for determining whether the processing units 150-153 share the instructions fetched by other processing units, or fetch the instructions by themselves.

Then, the content stored in the configuration memory 999 is described according to following definitions. The configuration memory 999 contains group tags gp corresponding to the processing units, each of which records a serial number of the group that the corresponding processing unit is belonged to, or 0 or null indicating that the processing unit is not belonged to any group. The configuration memory 999 further contains shared instruction flags sif, each of which records whether the corresponding processing unit shares an instruction fetched by a previous processing unit, or fetches the instructions by itself. As shown in FIG. 6A, the group tags of the processing units 150-153 are all 0, which represents that the processing units 150-153 are not belonged to any group, so that the instruction synchronization control circuit 154 controls the stall-output signals Stall_Out of the processing units to cause no Stall_In operations of the other processing units according to the setting of the configuration memory 999, this is because the instruction synchronization of the processing units is not ensured. Moreover, the shared instruction flags sif of the processing units 150-153 are all 0, so that the processing units 150-153 individually fetch the instructions, and do not share the instructions fetched by other processing units. Now, the processing units 150-153 independently execute the instructions, so that the processing units 150-153 are four independent processing units. Namely, the configurable processing apparatus 15 is equivalent to a processing apparatus with four independent SISD structures or one MIMD structure.

Figure 6B:
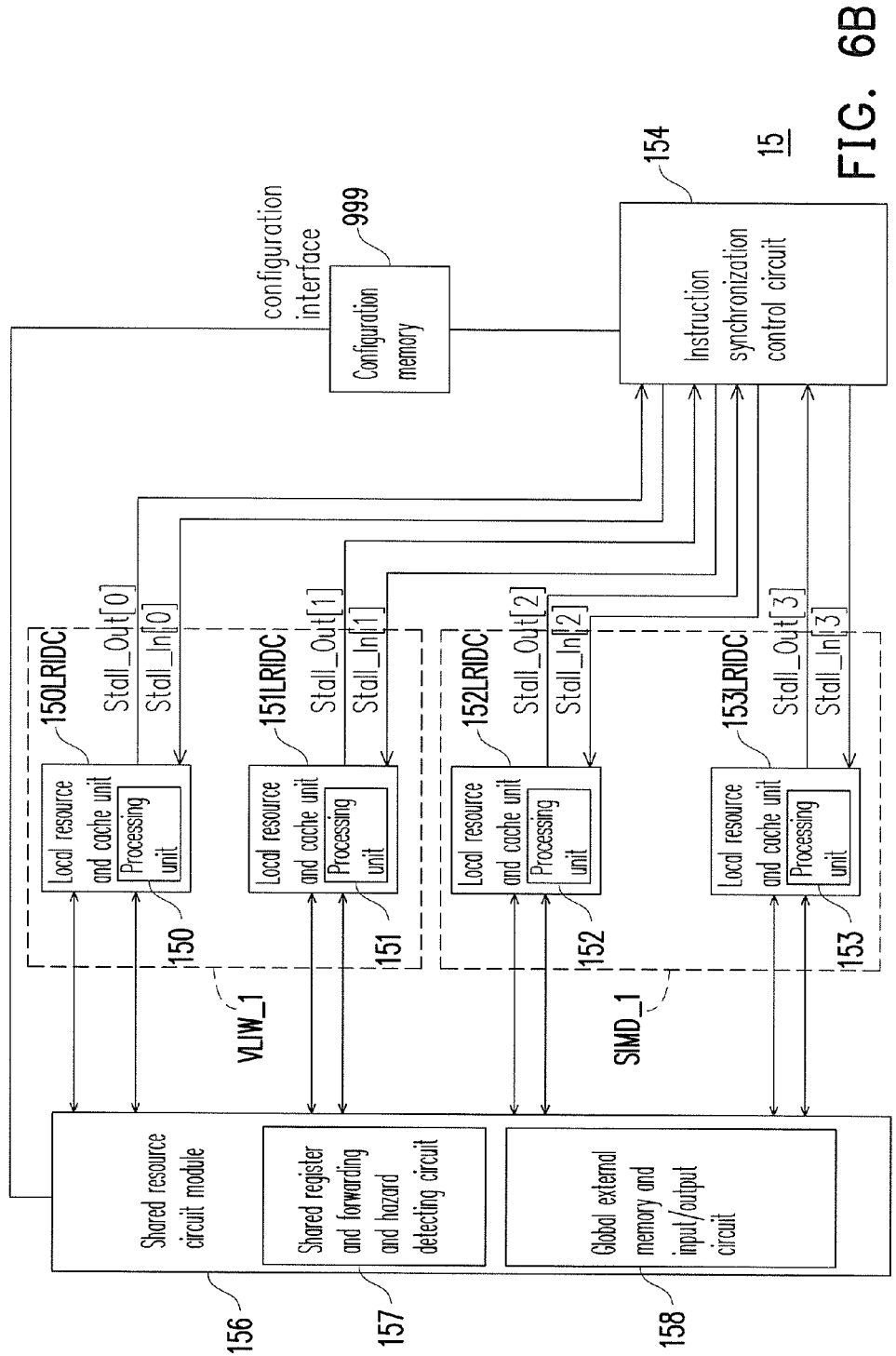
FIG. 6B is a schematic diagram illustrating a configurable processing apparatus 15 simultaneously having an SISD mode and a VLIW mode.

Moreover, as shown in FIG. 6B, if the group tags of the processing units 150 and 151 are all 1, which represents that the processing units 150 and 151 are belonged to the same group 1, and the shared instruction flags sif thereof are all 0, which represents that the processing units 150 and 151 individually fetch the instructions, the instruction synchronization control circuit 154 then controls the stall-output signals Stall_Out of the processing units 150 and 151 to cause mutual Stall_In operations between the processing units 150 and 151 according to the setting of the configuration memory 999, so that the instruction synchronization of the processing units 150 and 151 is achieved. Moreover, since the processing units 150 and 151 independently fetch the instructions, the processing units 150 and 151 are equivalent to a processing apparatus with the VLIW structure. In addition, if the group tags of the processing units 152 and 153 are all 2 according to the setting of the configuration memory 999, which represents that the processing units 152 and 153 are belonged to another group 2, the instruction synchronization control circuit 154 then controls the stall-output signals Stall_Out of the processing units 152 and 153 to cause mutual Stall_In operations between the processing units 152 and 153 according to the setting of the configuration memory 999, so that the instruction synchronization of the processing units 152 and 153 is achieved. Moreover, the shared instruction flag sif of the processing unit 152 is 0, which indicates that the processing unit 152 fetches the instruction by itself, and the shared instruction flag sif of the processing unit 153 is 1, which indicates that the processing unit 153 shares the instruction fetched by the previous processing unit 152. Therefore, the processing units 152 and 153 are equivalent to a processing apparatus of the SIMD structure. In addition, since the configuration memory circuit can be dynamically changed, before the processing units 152 and 153 enter the SIMD mode, i.e. before the instructions are shared, differentiation of the instructions is executed. For example, different data address pointer local registers are set, or other local registers or memories that can cause differences are set, so that after the SIMD mode is entered, though the same instruction is obtained, different data can still be processed. By such means, the configurable processing apparatus 15 is equivalent to a processing apparatus simultaneously having the SIMD structure and the VLIW structure.

In the exemplary embodiment of FIG. 6B, the instruction synchronization control circuit 154 can obtain operation states of the processing units 150-153 and other devices in the configurable processing apparatus 15. For example, the instruction synchronization control circuit 154 can obtain the operation states of the processing units 150-153 according to the stall-output signals of the processing units 150-153. Then, the instruction synchronization control circuit 154 generates the stall-in signals Stall_In[0]-Stall_In[3] to the processing units required to be synchronous according to the setting of the configuration memory 999.

Moreover, when the shared register and forwarding and hazard detecting circuit 157 detects a hazard, it outputs a hazard occurrence signal to notify the processing unit having the hazard, so that the processing unit sends the stall-output signals Stall_Out[0]-Stall_Out[3]. Similarly, the other devices can also cause the processing units sending the stall-output signals Stall_Out[0]-Stall_Out[3]. For example, when a certain processing unit accesses the global external memory and input/output circuit 158, the global external memory and input/output circuit 158 may request the processing unit to wait due to an access latency, so that the processing unit sends the stall-output signal Stall_Out. However, the present disclosure is not limited to the above example.

Figure 7A:
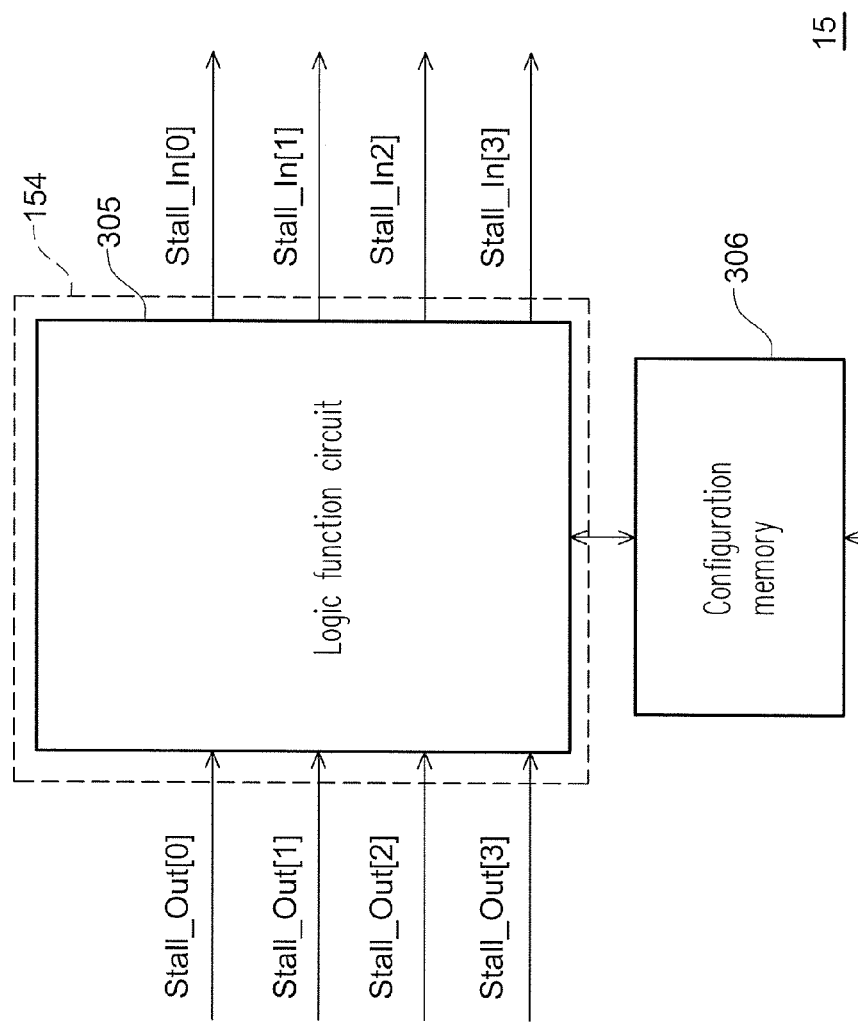
FIG. 7A is a system block diagram of an instruction synchronization control circuit 154 according to an exemplary embodiment of the present disclosure.
Figure 7B:
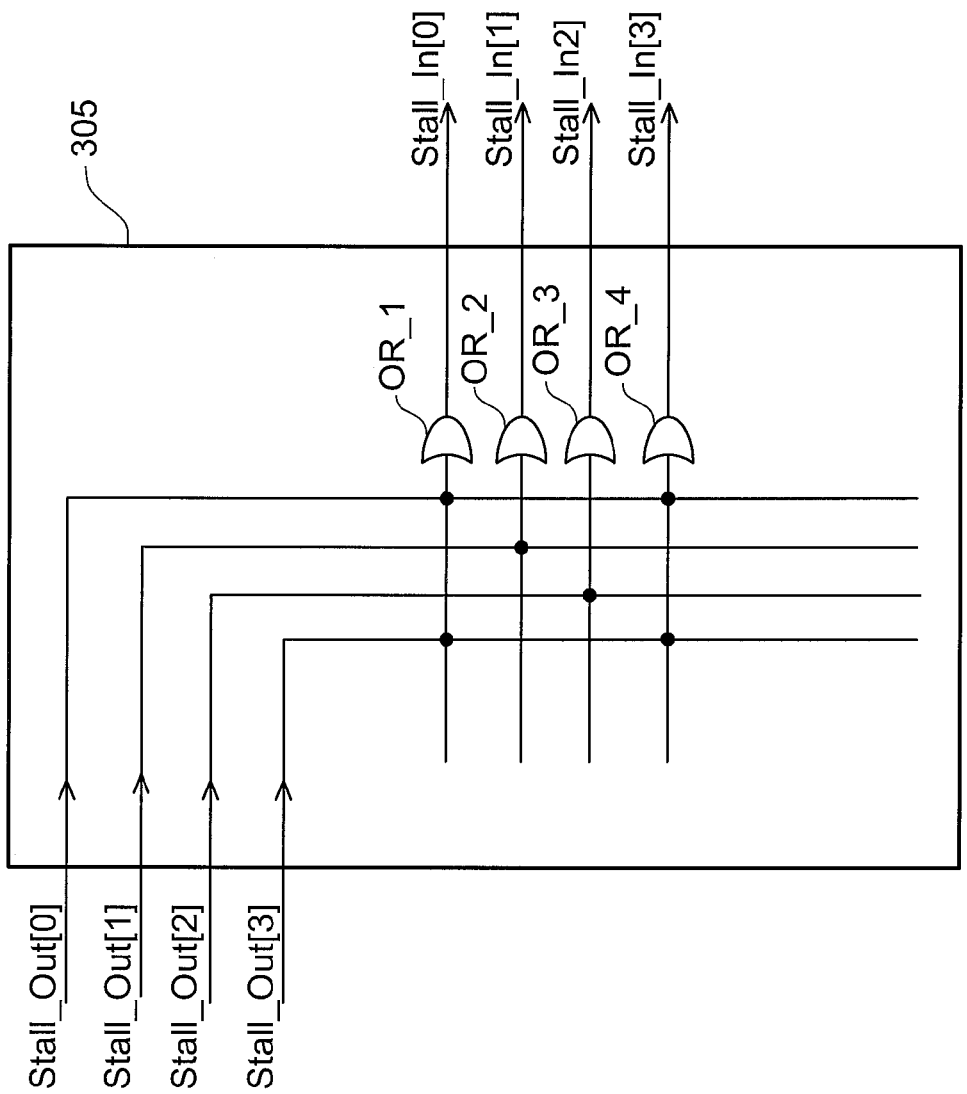
FIG. 7B is a circuit diagram illustrating a logic function circuit 305 according to an exemplary embodiment of the present disclosure.
Figure 7C:
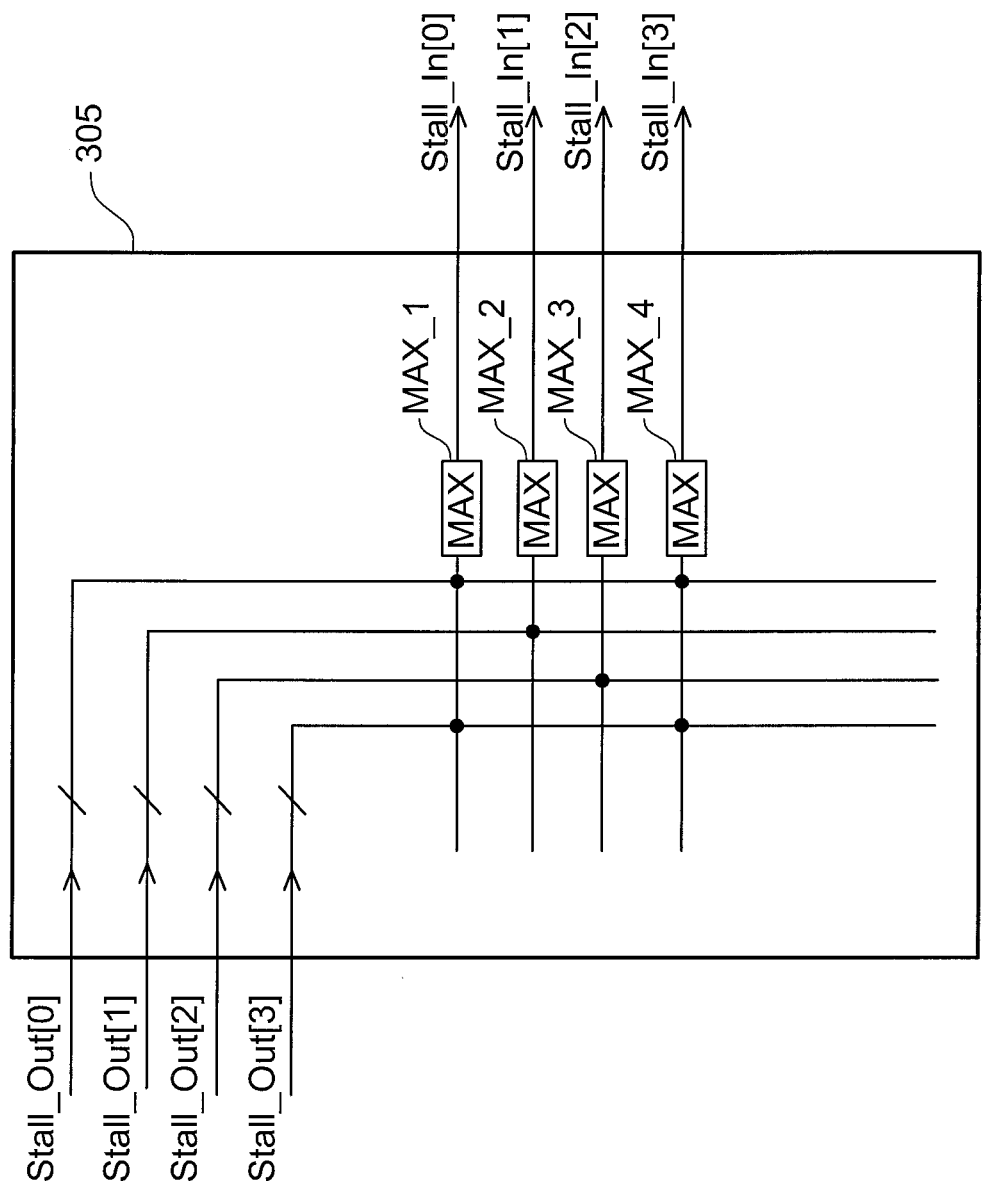
FIG. 7C is a circuit diagram illustrating a logic function circuit 305 according to another exemplary embodiment of the present disclosure.

Then, referring to FIGS. 7A and 7B, FIG. 7A is a system block diagram of the instruction synchronization control circuit 154 according to an exemplary embodiment of the present disclosure, and FIG. 7B is a circuit diagram illustrating a logic function circuit 305 according to an exemplary embodiment of the present disclosure. The instruction synchronization control circuit 154 includes the logic function circuit 305 and a configuration memory 306, wherein the logic function circuit 305 receives a plurality of the stall-output signals Stall_Out[0]-Stall_Out[3] and a content stored in the configuration memory 306, and generates the stall-in signals Stall_In[0]-Stall_In[3] according to the stall-output signals Stall_Out[0]-Stall_Out[3] and the content stored in the configuration memory 306. The logic function circuit 305 is, as that shown in FIG. 7B, formed by a plurality of OR gates OR_1-OR_4. The logic function circuit 305 determines which of the stall-output signals Stall_Out[0]-Stall_Out[3] are respectively included in each input signal of the OR gates OR_1-OR_4 corresponding to each of the stall-in signals Stall_In[0]-Stall_In[3] according to the content stored in the configuration memory 306, i.e. determines which of the stall-output signals Stall_Out[0]-Stall_Out[3] can influence each of the stall-in signals Stall_In[0]-Stall_In[3] according to the content stored in the configuration memory 306. In examples of FIGS. 10A-10E, the stall-in signals Stall_In[0]-Stall_In[3] are all multi-bit logic signals, which can record more than two states, and the logic function circuit 305 is, as that shown in FIG. 7C, formed by a plurality of maximum input value generation circuits MAX_1-MAX_4. The logic function circuit 305 determines which of the stall-output signals Stall_Out[0]-Stall_Out[3] are respectively included in each input signal of the maximum input value generation circuits MAX_1-MAX_4 corresponding to each of the stall-in signals Stall_In[0]-Stall_In[3] according to the content stored in the configuration memory 306, i.e. determines which of the stall-output signals Stall_Out[0]-Stall_Out[3] can influence each of the stall-in signals Stall_In[0]-Stall_In[3] according to the content stored in the configuration memory 306. The logic function circuits 305 of FIG. 7B and FIG. 7C are only examples, which are not used to limit the present disclosure.

The instruction synchronization control circuit 154 has a central control type implementation, and all of the processing units 150-153 are controlled by the instruction synchronization control circuit 154. In another embodiment, a plurality of instruction synchronization control circuits can be designed, and each of the instruction synchronization control circuits can control one processing unit. In other words, the central control type instruction synchronization control circuit 154 can be replaced by a plurality of decentralized control type instruction synchronization control circuits.

Figure 7D:
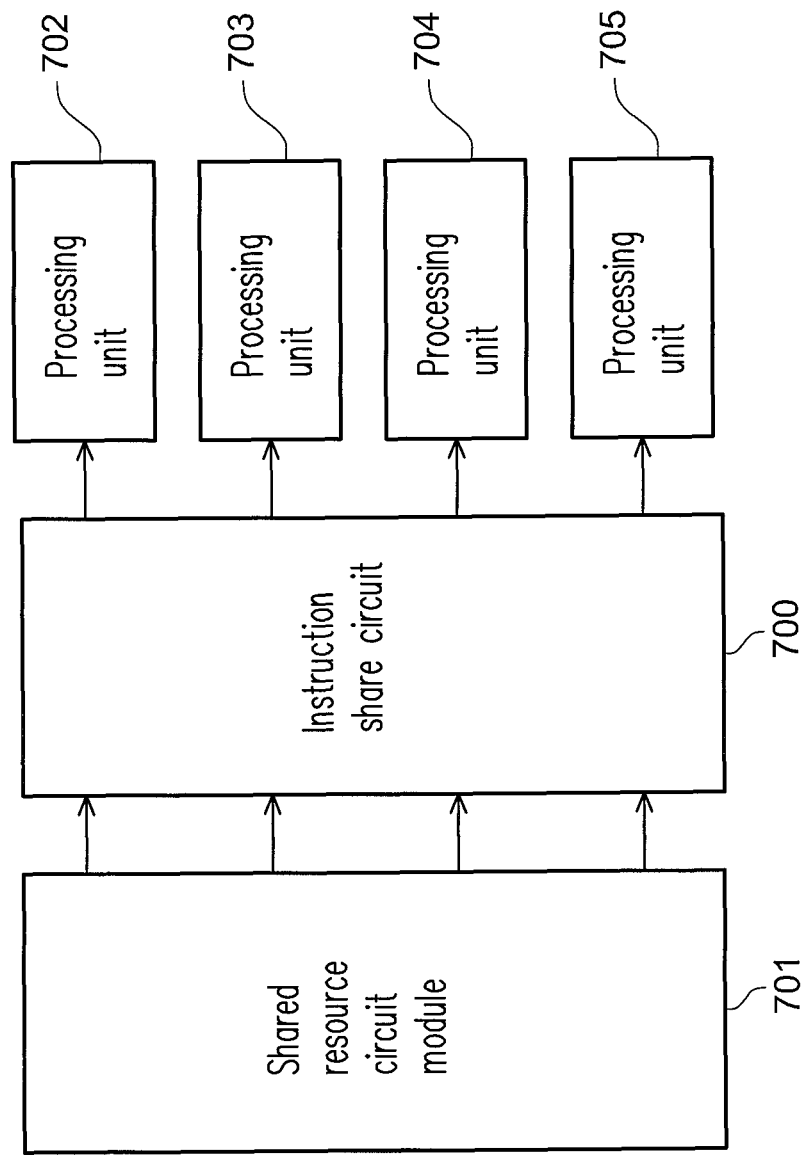
FIG. 7D is a block diagram illustrating a processing apparatus having an instruction share circuit according to an exemplary embodiment of the present disclosure.
Figure 7E:
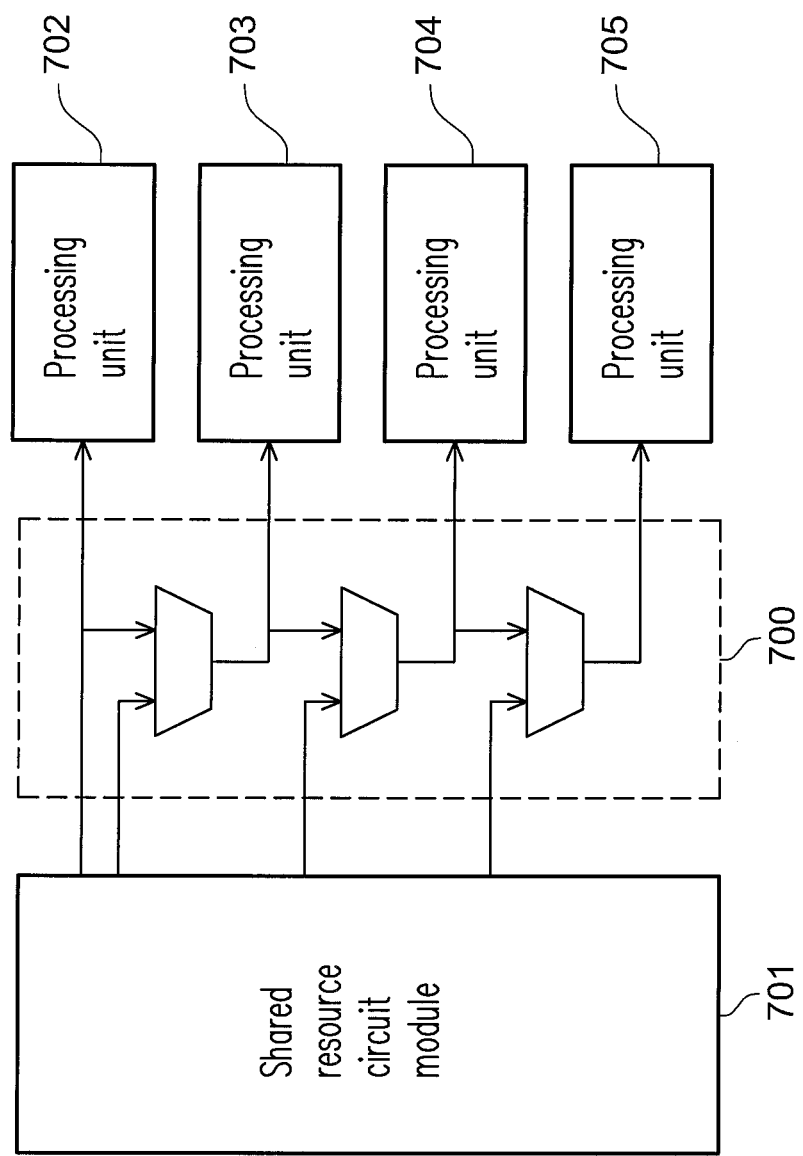
FIG. 7E is a detail circuit diagram illustrating an instruction share circuit according to an exemplary embodiment of the present disclosure.
Figure 7F:
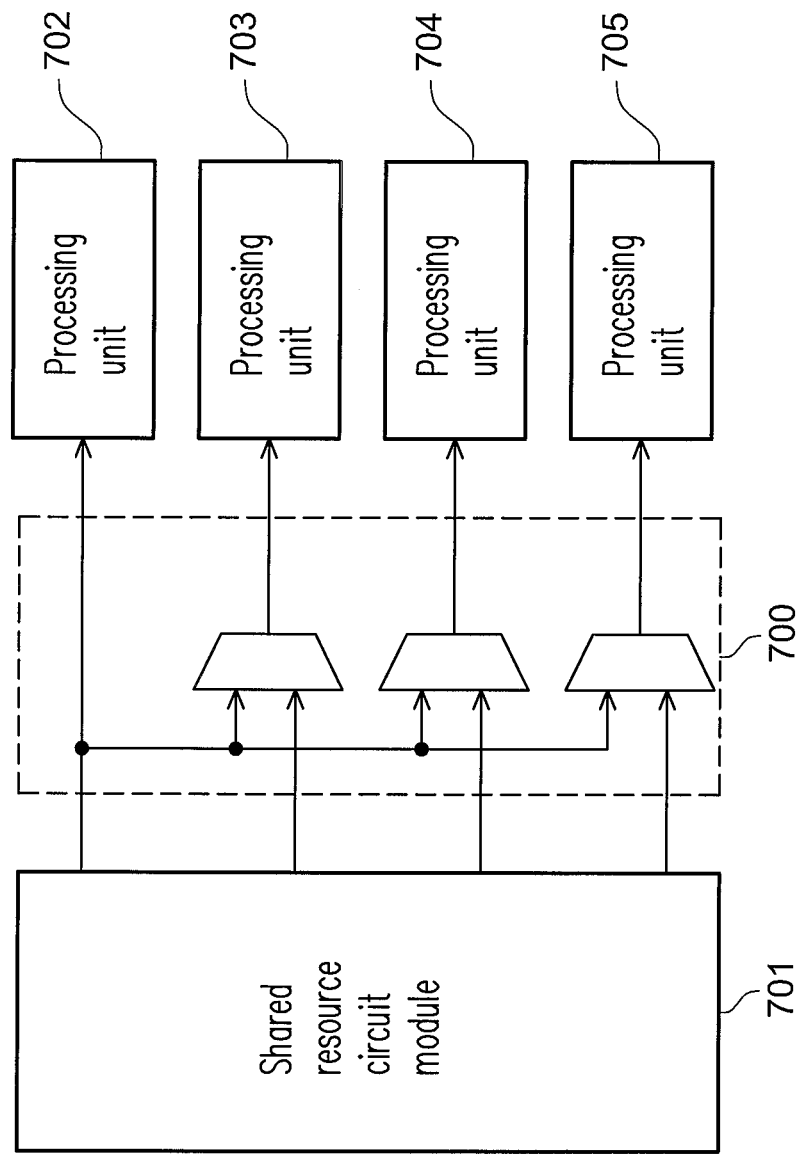
FIG. 7F is a detail circuit diagram illustrating an instruction share circuit according to another exemplary embodiment of the present disclosure.

Moreover, referring to FIG. 7D, FIG. 7D is a block diagram illustrating an instruction share circuit 700 according to an exemplary embodiment of the present disclosure. A detail implementation of the instruction share circuit 700 is as that shown in FIG. 7E or FIG. 7F. In FIG. 7E, when the shared instruction flag Sif in the configuration memory is 0, the corresponding processing unit (any one of 702-705) fetches the instruction by itself. Conversely, when the shared instruction flag Sif is 1, an instruction fetched by a previous processing unit (regardless of an instruction fetched by the previous processing unit itself or an instruction came from a further previous processing unit) is forwarded to the corresponding processing unit (any one of 702-705) through a corresponding multiplexer. As shown in FIG. 7F, the shared instructions can also be broadcasted by a shared bus connection. According to these instruction share circuits and mechanisms thereof, times for repeatedly reading the memory and a corresponding power consumption thereof can be reduced. The circuits of FIG. 7E and FIG. 7F are only used as examples, which are not used to limit the present disclosure.

Figure 8A:
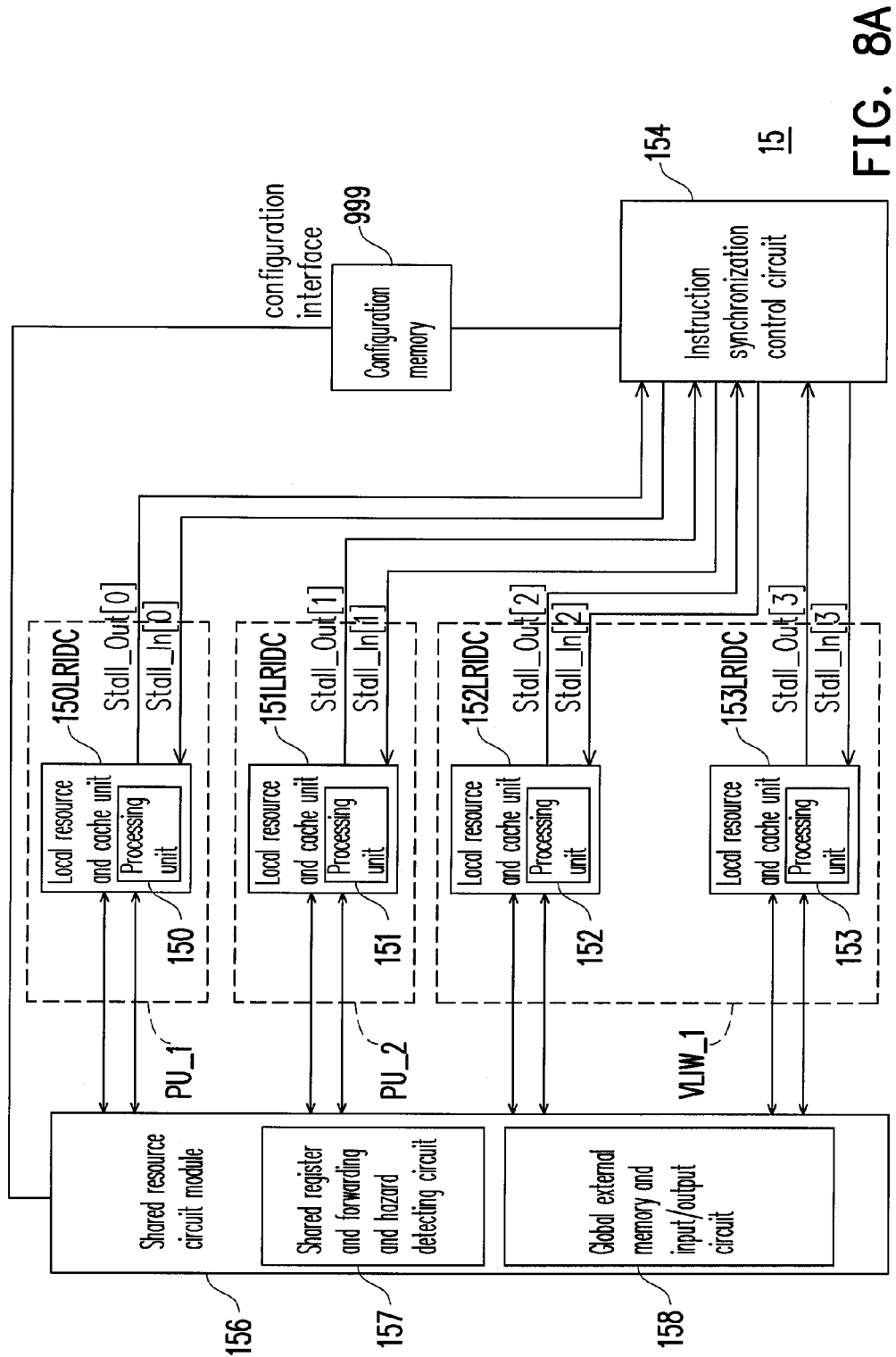
FIG. 8A is a schematic diagram illustrating a configurable processing apparatus 15 simultaneously having an independent SISD or MIMD mode and a VLIW mode.

Referring to FIG. 8A, FIG. 8A is a schematic diagram of the configurable processing apparatus 15 simultaneously having the independent SISD or MIMD mode and the VLIW mode. In the exemplary embodiment of FIG. 8A, the processing units 150 and 151 are respectively independent SISD or MIMD mode processing units PU1 and PU2 according to the settings of the configuration memory 999 that the group tags gp are all 0 and the shared instruction flags sif are all 0. Moreover, the processing units 152 and 153 form a group VLIW_1 of the VLIW mode according to the settings of the configuration memory 999 that the group tags gp are all 1 and the shared instruction flags sif are all 0.

Figure 8C:
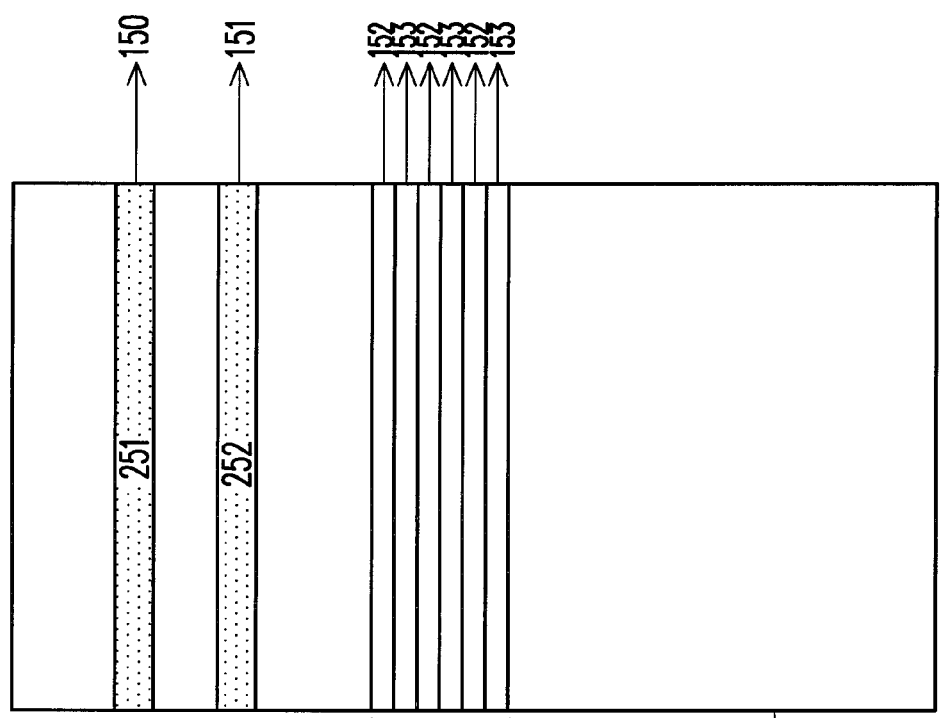
FIG. 8C is another schematic diagram illustrating a process that processing units 150-153 of FIG. 8A fetch instructions.
Figure 8B:
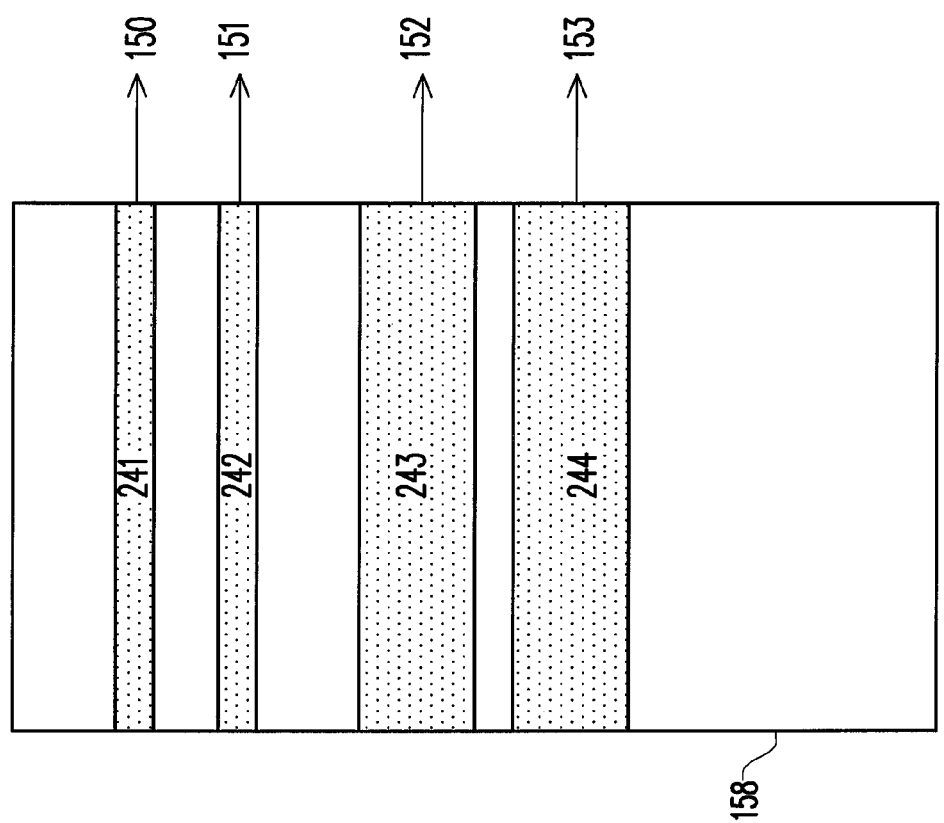
FIG. 8B is a schematic diagram illustrating a process that processing units 150-153 of FIG. 8A fetch instructions.

Then, referring to FIG. 8B, FIG. 8B is a schematic diagram illustrating a process that the processing units 150-153 of FIG. 8A fetch instructions. The processing units 150 and 151 are respectively operated in the independent SISD or MIMD mode, so that the processing units 150 and 151 respectively fetch instruction from the global external memory and input/output circuit 158 or their local resource and cache memories, wherein addresses of instruction blocks 241 and 242 are independent. The processing units 152 and 153 are operated in the group VLIW_1 of the VLIW mode. Different to a general instruction-fetching pattern of the VLIW mode, in the present embodiment, instead of sequentially fetching different instructions from a same instruction block, the processing units 152 and 153 can sequentially fetch instructions from different instruction blocks 243 and 244. Instruction pointers (or program counters) used as instruction fetching addresses by the processing units may have different or settable hardware initial values.

Then, referring to FIG. 8C, FIG. 8C is another schematic diagram illustrating a process that the processing units 150-153 of FIG. 8A fetch instructions. The processing units 150 and 151 are respectively operated in the independent SISD or MIMD mode, so that the processing units 150 and 151 can respectively fetch instructions from instruction blocks 251 and 252 of the global external memory and input/output circuit 158, wherein addresses of the instruction blocks 251 and 252 are independent. Moreover, in the present embodiment, the processing units 152 and 153 are operated in the group VLIW_1 of the VLIW mode, and the processing units 152 and 153 sequentially fetch different instructions from a same instruction block 253 according to a conventional method. For example, before such mode is entered, besides an instruction start point of each processing unit is set according to a branch instruction, an instruction address fetching interval of the processing units is further set according to a number of the processing units in the VLIW group, and a length of the instruction executed under such mode has to be a fixed length. Though, in the exemplary embodiment of FIG. 8B, such limitation does not exist.

Then, referring to FIG. 8D, FIG. 8D is a schematic diagram illustrating the instructions contained in the instruction block 253 of FIG. 8C. During a first cycle, the processing units 152 and 153 respectively fetch the instructions of the addresses FAx0A and FAx0C. During a second cycle, the processing units 152 and 153 respectively fetch the instructions of the addresses FAx0E and FAx10. During a third cycle, the processing units 152 and 153 respectively fetch the instructions of the addresses FAx12 and FAx14. After the instruction of the address FAx0A is executed, data in the register r5 is renewed, so that when the instruction of the address FAx0E is executed, the renewed data of the register r5 is required. Therefore, the processing units 152 and 153 can forward the processed data through the shared register and forwarding and hazard detecting circuit 157, so as to share the processed data. Similarly, after the instruction of the address FAx0E is executed, data in the register r7 is renewed, so that when the instruction of the address FAx14 is executed, the renewed data of the register r7 is required. Therefore, the processing units 152 and 153 can share the processed data through the shared register and forwarding and hazard detecting circuit 157, so as to successfully and correctly execute the instructions and process data.

Referring to FIG. 8A, FIG. 8A is a schematic diagram of the configurable processing apparatus 15 simultaneously having the independent SISD or MIMD mode and the VLIW mode. In the exemplary embodiment of FIG. 8A, the processing units 150 and 151 are respectively independent SISD or MIMD mode processing units PU1 and PU2 according to the settings of the configuration memory 999 that the group tags gp are all 0 and the shared instruction flags sif are all 0. Moreover, the processing units 152 and 153 form the group VLIW_1 of the VLIW mode according to the settings of the configuration memory 999 that the group tags gp are all 1 and the shared instruction flags sif are all 0.

Referring to FIG. 6B, FIG. 6B is a schematic diagram of the configurable processing apparatus 15 simultaneously having the SISD mode and the VLIW mode. In the exemplary embodiment of FIG. 6B, the processing units 150 and 151 form a group SIMD_1 of the SIMD mode according to the settings of the configuration memory 999 that the group tags gp are all 1. Moreover, the processing units 152 and 153 form a group VLIW_1 of the VLIW mode according to the settings of the configuration memory 999 that the group tags gp are all 2 and the shared instruction flags sif are all 0.

Figure 9B:
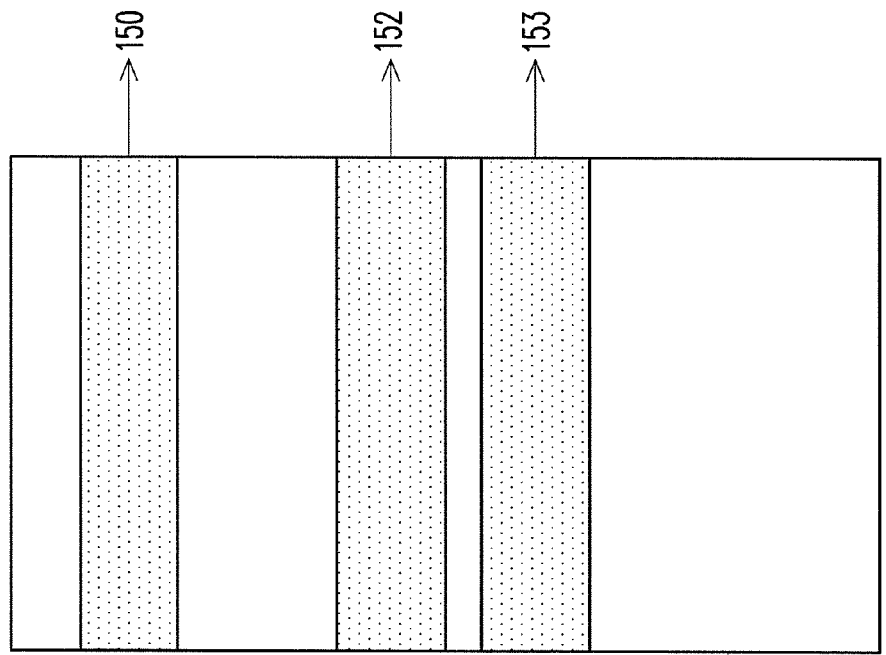
FIG. 9B is another schematic diagram illustrating a process that processing units 150-153 of FIG. 6B fetch instructions.
Figure 9A:
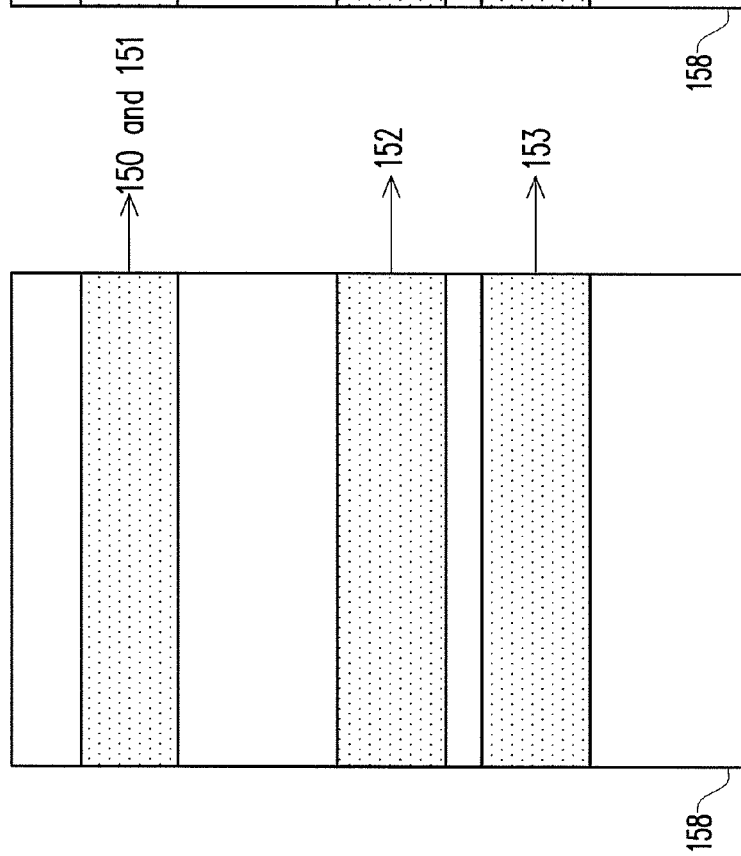
FIG. 9A is a schematic diagram illustrating a process that processing units 150-153 of FIG. 6B fetch instructions.

The instructions received by the processing units 150 and 151 in the group SIMD_1 of the SIMD mode are the same, and the processed data can be different. There are two ways to achieve the function of the SIMD mode, referring to FIG. 9A, a first way is that the shared instruction flags sif in the configuration memory 999 corresponding to the processing units 150 and 151 are all 0, so that the processing units 150 and 151 independently fetch the instructions from the shared resource circuit module or the individual local resource and cache memory, and when the processing units 150 and 151 enter the SIMD mode, the instruction pointers thereof are pointed to the blocks having the same program codes that are located at the same or different addresses, so as to implement the SIMD mode. Referring to FIG. 9B, the second way is that the shared instruction flag sif of the processing unit 150 is 0, and the shared instruction flag sif of the processing unit 150 is 1, so that the processing unit 151 shares the instruction fetched by the previous processing unit 150. Therefore, the processing units 150 and 151 can obtain the same instruction, so that the SIMD mode is implemented.

The processing units (having the SISD, the MIMD or the VLIW mode) that independently fetch the instructions have independent instruction pointers, and besides using a mechanism of directly switching shared instructions, the branch instructions or other flow control instructions or mechanisms for changing the instruction pointers can also be separately or simultaneously used, so as to achieve the same instruction pointer to enter the SIMD mode. If the processing units record return instructions or other different target addresses or information in the memory or the register before the instruction pointers thereof are changed to the same instruction pointer to enter the SIMD mode, in the SIMD mode, by executing the return instructions, or referring to a former record to change the flow control instructions or mechanisms of the instruction pointers, the instruction pointers of the processing units are again independent and different, so that the processing units can leave the SIMD mode. Moreover, in the SISD, the MIMD or the VLIW mode, the processing units independently fetch instructions, and the instruction pointers thereof are mutually different. Therefore, switching of these modes can be implemented by changing an instruction synchronization mechanism, i.e. changing the group tags of the configuration memory, in this embodiment.

According to the above embodiments, the processing apparatus of FIG. 6A can be a configurable processing apparatus having multiple modes, in which the configuration memory 999 and the instruction synchronization control circuit 154 are important elements. The processing apparatus controls an instruction synchronization mode of the processing units 150-153 according to the group distinction. Though, the above embodiments are not used to limit the present disclosure, and the configuration memory 999 can record other information for the instruction synchronization control circuit to control the instruction synchronization mode of the processing units. For example, the configuration memory 999 can record an overall processing apparatus mode, and the instruction synchronization control circuit controls the instruction synchronization mode of the processing units according to a setting of the overall processing apparatus mode. Therefore, in the configurable processing apparatus of the present disclosure, the instruction synchronization control circuit 154 controls the behaviour such as stall and wait of each of the processing units 150-153 according to the content of the configuration memory, so that the configurable processing apparatus 15 can be a processing apparatus having a plurality of processing unit instruction synchronization modes.

When the configurable processing apparatus 15 processes a program, each of the processing units 150-153 can be stalled by the instruction synchronization control circuit 154 due to unexpected stall of the other processing unit in the group, so that an execution result generated when the group executes the instruction is a correct result. Sources for generating the unexpected stall include an external stall request (for example, the stall request of the memory or an output/input device generated due to an access latency), and the stall request between the processing units.

According to the above embodiments, regarding the processing units having the same non-zero group tag and belonged to the same group, the instruction synchronization control circuit 154 can control the stall-output signals Stall_Out of the processing units to cause the Stall_In operations of the other processing units according to the setting of the configuration memory 999, so as to ensure the instruction synchronization of the processing units. Examples are provided below to describe situations that the unexpected stalls are occurred to the processing units in the instruction synchronous group, and methods for dealing the unexpected stalls to achieve the instruction synchronization.

In the examples of FIGS. 10A-10E, the instruction synchronization of the processing units PU1, PU2 and PU3 is achieved according to the setting of the configuration memory, and each of the processing unit has a pipeline structure, wherein a sequence and serial numbers of the pipeline structure from a first stage to a last stage are sequentially five pipeline stages of instruction fetch (1), instruction decode (2), instruction execution (3), data access (4) and write back (5). The stall-output signal Stall_Out of the corresponding processing unit records the serial number of the last pipeline stage of the processing unit where the stall is occurred. For example, if the processing unit has a stall request of the instruction execution pipeline stage, the stall-output signal Stall_Out is 3, if the processing unit simultaneously has stall requests of the instruction fetch and the data access pipeline stages, the stall-output signal Stall_Out is 4, and if the processing unit does not have the stall request of the pipeline stage, the stall-output signal Stall_Out is 0. The stall-in signal Stall_In of each processing unit indicates that the recorded pipeline stage and the previous pipeline stages (i.e. all of the pipeline stages whose serial number are less than and equal to the stall-in signal Stall_In) of the processing unit have to be stalled. For example, if the corresponding stall-in signal Stall_In of the processing unit is 3, the pipeline stages of the instruction fetch, the instruction decode, and the instruction execution have to be stalled. Here, stall of the pipeline stage of the processing unit refers to that the corresponding pipeline stage cannot deliver an execution result to a following pipeline stage, though an executing and effective task in such pipeline stage can still be carried on. For example, during a certain cycle, if the instruction fetch pipeline stage is stalled by the stall-in signal Stall_In while executing the instruction fetch, the instruction fetch pipeline stage can still carry on the instruction fetch task, though it cannot deliver the execution result to the following instruction decode pipeline stage during this cycle. Moreover, if the pipeline stage does not have the stall request, it does not provide the stall-output signal Stall_Out due to the Stall_In stall requests of the other processing units or pipeline stages. In addition, in the following examples, the registers r0-r15 are belonged to the shared resource registers, which have a hazard detecting circuit for checking a using dependency of the shared resource registers, and detecting occurrence of a hazard and notifying the processing unit having the hazard, and have a forwarding circuit for forwarding data according to the using dependency of the shared resource registers, so that the renewed data can be used by following instructions in advance before it is written to the shared resource register.

Figure 10A:
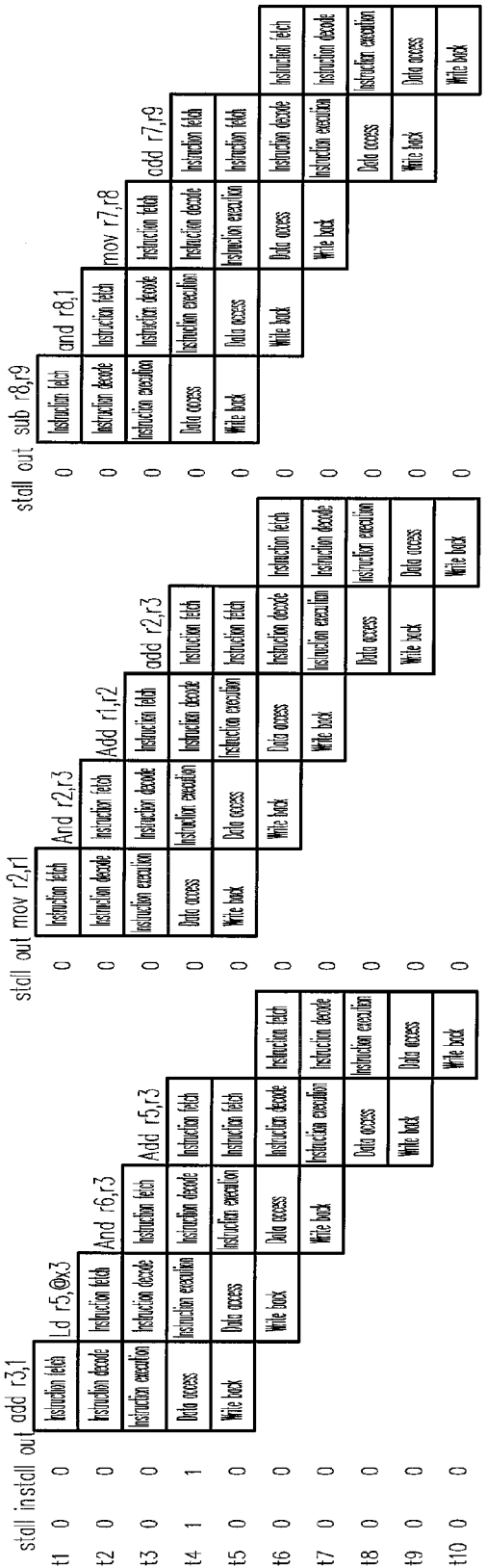
FIG. 10A is a schematic diagram illustrating a situation that a pipeline processing apparatus processes an unexpected stall.

Referring to FIG. 10A, during a time cycle t4, since the processing unit PU1 is failed to opportunely obtain a required instruction from the memory (the instruction is not ready), the processing unit PU1 sends a stall request of the instruction fetch (1) pipeline stage to the instruction synchronization control circuit by outputting the stall-output signal Stall_Out of 1. Therefore, during this cycle, the stall-output signals Stall_Out of the processing units PU1, PU2 and PU3 are respectively 1, 0, and 0. The instruction synchronization control circuit obtains information that the instruction synchronization of the processing units PU1, PU2 and PU3 has to be achieved according to the setting of the configuration memory, and determines to output 1 to the stall-in signals Stall_In of the three instruction synchronous processing units according to a fact that the last pipeline stage of the three instruction synchronous processing units wherein the stall is occurred is 1, so as to request the processing units PU1, PU2 and PU3 to simultaneously stall the instruction fetch pipeline stages. Now, the instruction fetch pipeline stages can carry on the instruction fetch tasks, though the execution results thereof cannot be delivered to the following instruction decode pipeline stages during this cycle. According to such stall control, the pipeline stage timings of the processing units PU1, PU2 and PU3 are maintained consistent, so that the instruction synchronization of the processing units PU1, PU2 and PU3 is achieved. During the time cycle t5, the instruction required by the processing unit PU1 is ready, and the processing unit PU1 obtains the required instruction, so that the processing unit PU1 changes the stall-output signal Stall_Out to 0, which represents that the processing unit PU1 does not have the pipeline stage stall. Therefore, during this cycle, the instruction synchronization control circuit determines to output 0 to the stall-in signals Stall_In of the three processing units to release the stall request of the pipeline stages of the processing units PU1, PU2 and PU3 due to that the stall-output signals Stall_Out of the processing units PU1, PU2 and PU3 are respectively 0, 0, 0 (i.e. no stall is occurred to any pipeline stage of the three instruction synchronous processing units), so that the processing units PU1, PU2 and PU3 simultaneously end suspension states and continually execute the instructions.

Figure 10B:
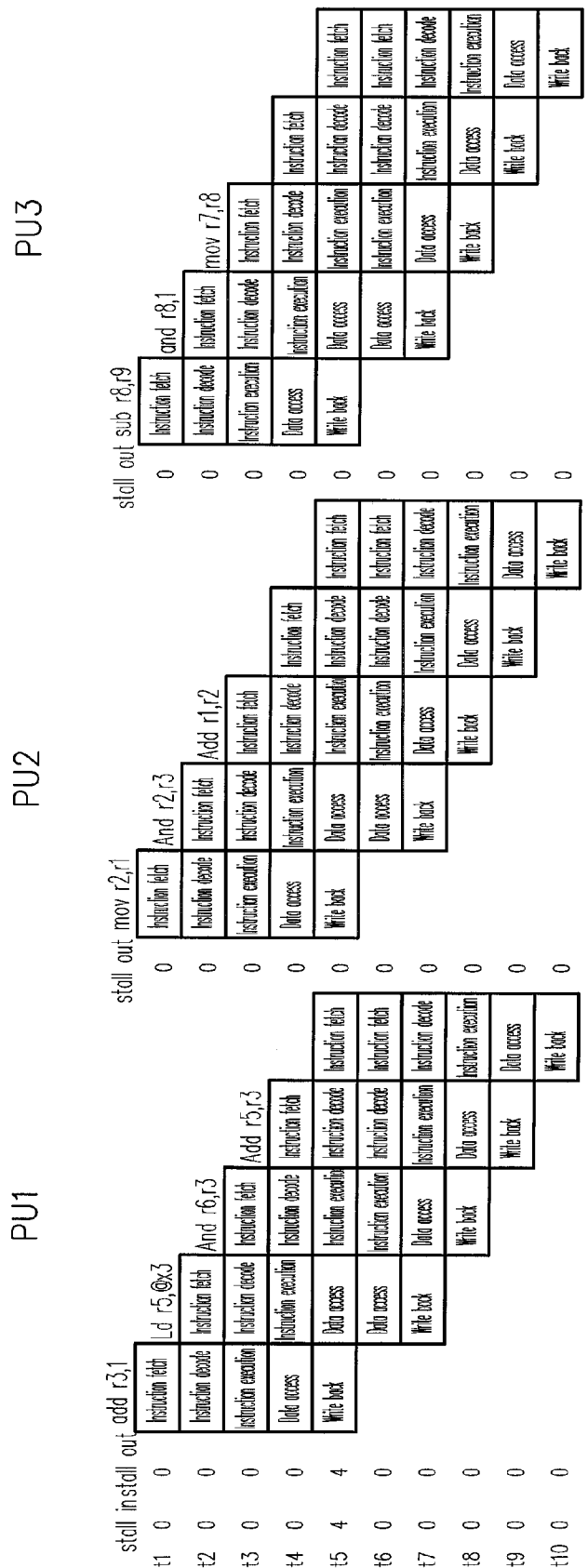
FIG. 10B is another schematic diagram illustrating a situation that a pipeline processing apparatus processes an unexpected stall.

Referring to FIG. 10B, during a time cycle t5, since a data access stall is occurred when the instruction LD r5, @x3 of the processing unit PU1 read data (data is not ready), the processing unit PU1 sends a stall request of the data access (4) pipeline stage to the instruction synchronization control circuit by outputting the stall-output signal Stall_Out of 4. Therefore, during this cycle, the stall-output signals Stall_Out of the processing units PU1, PU2 and PU3 are respectively 4, 0, 0. The instruction synchronization control circuit obtains information that the instruction synchronization of the processing units PU1, PU2 and PU3 has to be achieved according to the setting of the configuration memory, and determines to output 4 to the stall-in signals Stall_In of the three instruction synchronous processing units according to a fact that the last pipeline stage of the three instruction synchronous processing units wherein the stall is occurred is 4, so as to request the processing units PU1, PU2 and PU3 to simultaneously stall the instruction fetch (1), the instruction decode (2), the instruction execution (3) and the data access (4) pipeline stages. Now, the stalled pipeline stages can still carry on their tasks, though the execution results thereof cannot be delivered to the following pipeline stages during this cycle. According to such stall control, the pipeline stage timings of the processing units PU1, PU2 and PU3 are maintained consistent, so that the instruction synchronization of the processing units PU1, PU2 and PU3 is achieved. During a time cycle t6, the data to be read by the processing unit PU1 is ready, and the processing unit PU1 obtains the required data, so that the processing unit PU1 changes the stall-output signal Stall_Out to 0, which represents that the processing unit PU1 does not have the pipeline stage stall. Therefore, during this cycle, the instruction synchronization control circuit determines to output 0 to the stall-in signals Stall_In of the three processing units to release the stall request of the pipeline stages of the processing units PU1, PU2 and PU3 due to that the stall-output signals Stall_Out of the processing units PU1, PU2 and PU3 are respectively 0, 0, 0 (i.e. no stall is occurred to any pipeline stage of the three instruction synchronous processing units), so that the processing units PU1, PU2 and PU3 simultaneously end the suspension states and continually execute the instructions.

Figure 10C:
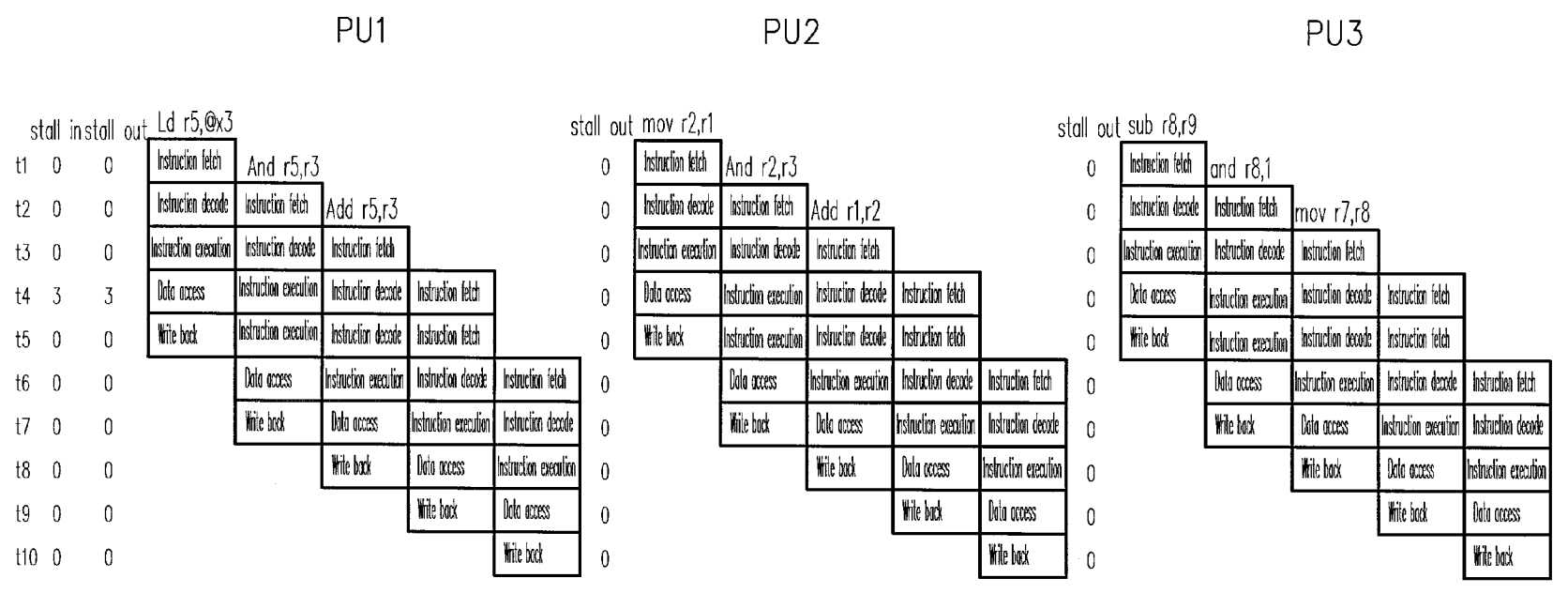

Referring to FIG. 10C, the processing unit PU1 fetches the instruction Ld r5, @x3 during the time cycle t1, and the instruction Ld r5, @x3 can read the data of the address @x3 in the memory only when the time cycle t4 is ended, and then the read data is written into the register r5 during the time cycle t5. Then, the processing unit PU1 fetches the instruction Add r5, r3 during the time cycle t2, and the instruction Add r5, r3 obtains and adds data of the registers r3 and r5 during the time cycle t4, and then stores an adding result in the register r5. When the processing unit PU1 executes the instruction Add r5, r3, the data of the register r5 expected by a programmer or a compiler is a new data of the register r5, wherein the new data is the content of the address @x3 in the memory that is read by the instruction Ld r5, @x3 and is about to be written into the register r5. When the instruction Add r5, r3 read the shared resource register r5, the hazard detecting circuit notifies the processing unit PU1 occurrence of the hazard. Therefore, during the time cycle t4, before the processing unit PU1 obtains the data stored in the register r5 or obtains the new data of the register r5 through the forwarding circuit, the processing unit PU1 sends a stall request of the instruction execution (3) pipeline stage to the instruction synchronization control circuit by outputting the stall-output signal Stall_Out of 3. Therefore, during this cycle, the stall-output signals Stall_Out of the processing units PU1, PU2 and PU3 are respectively 3, 0, 0. The instruction synchronization control circuit obtains information that the instruction synchronization of the processing units PU1, PU2 and PU3 has to be achieved according to the setting of the configuration memory, and determines to output 3 to the stall-in signals Stall_In of the three instruction synchronous processing units according to a fact that the last pipeline stage of the three instruction synchronous processing units wherein the stall is occurred is 3, so as to request the processing units PU1, PU2 and PU3 to simultaneously stall the instruction fetch (1), the instruction decode (2), and the instruction execution (3) pipeline stages. Now, the stalled pipeline stages can still carry on their tasks, though the execution results thereof cannot be delivered to the following pipeline stages during this cycle. According to such stall control, the pipeline stage timings of the processing units PU1, PU2 and PU3 are maintained consistent, so that the instruction synchronization of the processing units PU1, PU2 and PU3 is achieved. During the time cycle t5, the data of the register r5 required by the processing unit PU1 is obtained by the data access pipeline stage of the processing unit PU1 and is forwarded to the instruction execution pipeline stage, so that the processing unit PU1 changes the stall-output signal Stall_Out to 0, which represents that the processing unit PU1 does not have the pipeline stage stall. Therefore, during this cycle, the instruction synchronization control circuit determines to output 0 to the stall-in signals Stall_In of the three processing units to release the stall request of the pipeline stages of the processing units PU1, PU2 and PU3 due to that the stall-output signals Stall_Out of the processing units PU1, PU2 and PU3 are respectively 0, 0, 0 (i.e. no stall is occurred to any pipeline stage of the three instruction synchronous processing units), so that the processing units PU1, PU2 and PU3 simultaneously end the suspension states and continually execute the instructions.

Figure 10D:
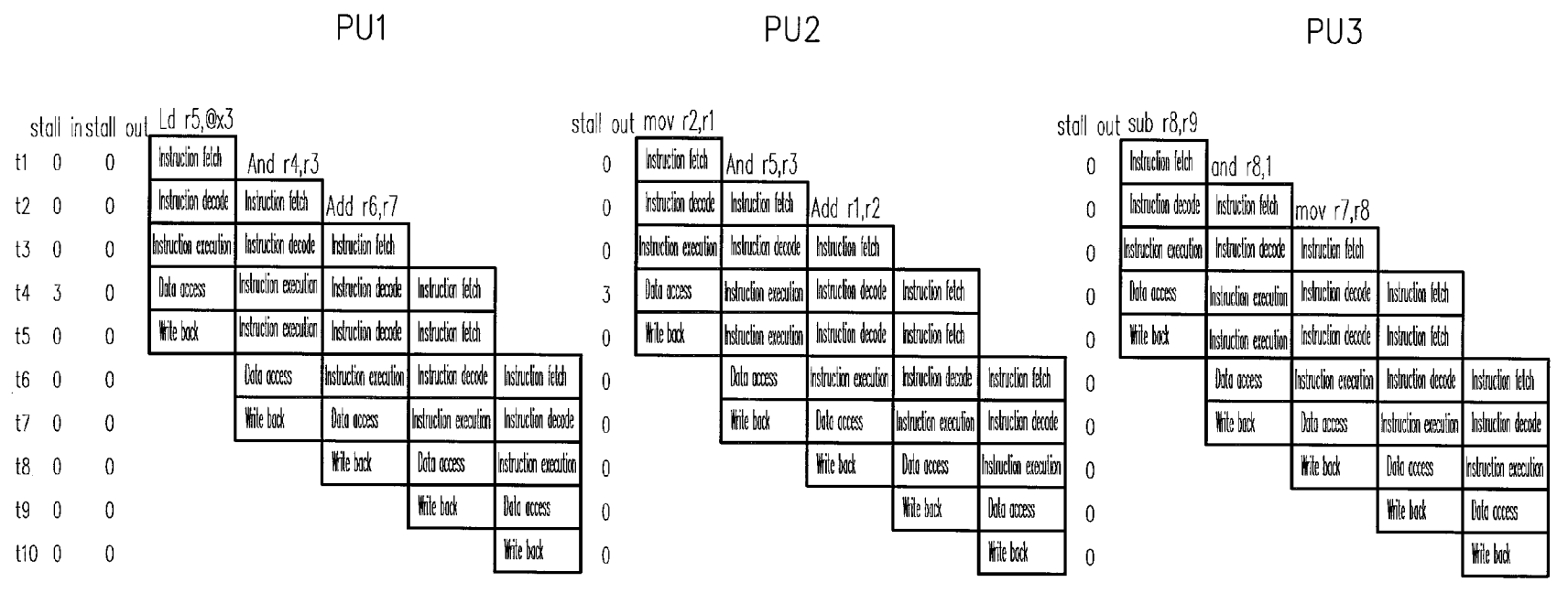

Referring to FIG. 10D, the processing unit PU1 fetches the instruction Ld r5, @x3 during the time cycle t1, and the instruction Ld r5, @x3 can read the data of the address @x3 in the memory only when the time cycle t4 is ended, and then the read data is written into the register r5 during the time cycle t5. Then, the processing unit PU2 fetches the instruction Add r5, r3 during the time cycle t2, and the instruction Add r5, r3 obtains and adds data of the registers r3 and r5 during the time cycle t4, and then stores an adding result in the register r5. When the processing unit PU2 executes the instruction Add r5, r3, the data of the register r5 expected by the programmer or the compiler is a new data of the register r5, wherein the new data is the content of the address @x3 in the memory that is read by the instruction Ld r5, @x3 of the processing unit PU1 and is about to be written into the register r5. When the instruction Add r5, r3 of the processing unit PU2 read the shared resource register r5, the hazard detecting circuit notifies the processing unit PU2 occurrence of the hazard. Therefore, during the time cycle t4, before the processing unit PU1 obtains the data stored in the register r5 or obtains the new data of the register r5 through the forwarding circuit, the processing unit PU2 sends a stall request of the instruction execution (3) pipeline stage to the instruction synchronization control circuit by outputting the stall-output signal Stall_Out of 3. Therefore, during this cycle, the stall-output signals Stall_Out of the processing units PU1, PU2 and PU3 are respectively 0, 3, 0. The instruction synchronization control circuit obtains information that the instruction synchronization of the processing units PU1, PU2 and PU3 has to be achieved according to the setting of the configuration memory, and determines to output 3 to the stall-in signals Stall_In of the three instruction synchronous processing units according to a fact that the last pipeline stage of the three instruction synchronous processing units wherein the stall is occurred is 3, so as to request the processing units PU1, PU2 and PU3 to simultaneously stall the instruction fetch (1), the instruction decode (2), and the instruction execution (3) pipeline stages. Now, the stalled pipeline stages can still carry on their tasks, though the execution results thereof cannot be delivered to the following pipeline stages during this cycle. According to such stall control, the pipeline stage timings of the processing units PU1, PU2 and PU3 are maintained consistent, so that the instruction synchronization of the processing units PU1, PU2 and PU3 is achieved. During the time cycle t5, the data of the register r5 required by the processing unit PU1 is obtained by the data access pipeline stage of the processing unit PU1 and is forwarded to the instruction execution pipeline stage of the processing unit PU2, so that the processing unit PU2 changes the stall-output signal Stall_Out to 0, which represents that the processing unit PU2 does not have the pipeline stage stall. Therefore, during this cycle, the instruction synchronization control circuit determines to output 0 to the stall-in signals Stall_In of the three processing units to release the stall request of the pipeline stages of the processing units PU1, PU2 and PU3 due to that the stall-output signals Stall_Out of the processing units PU1, PU2 and PU3 are respectively 0, 0, 0 (i.e. no stall is occurred to any pipeline stage of the three instruction synchronous processing units), so that the processing units PU1, PU2 and PU3 simultaneously end the suspension states and continually execute the instructions.

Figure 10E:
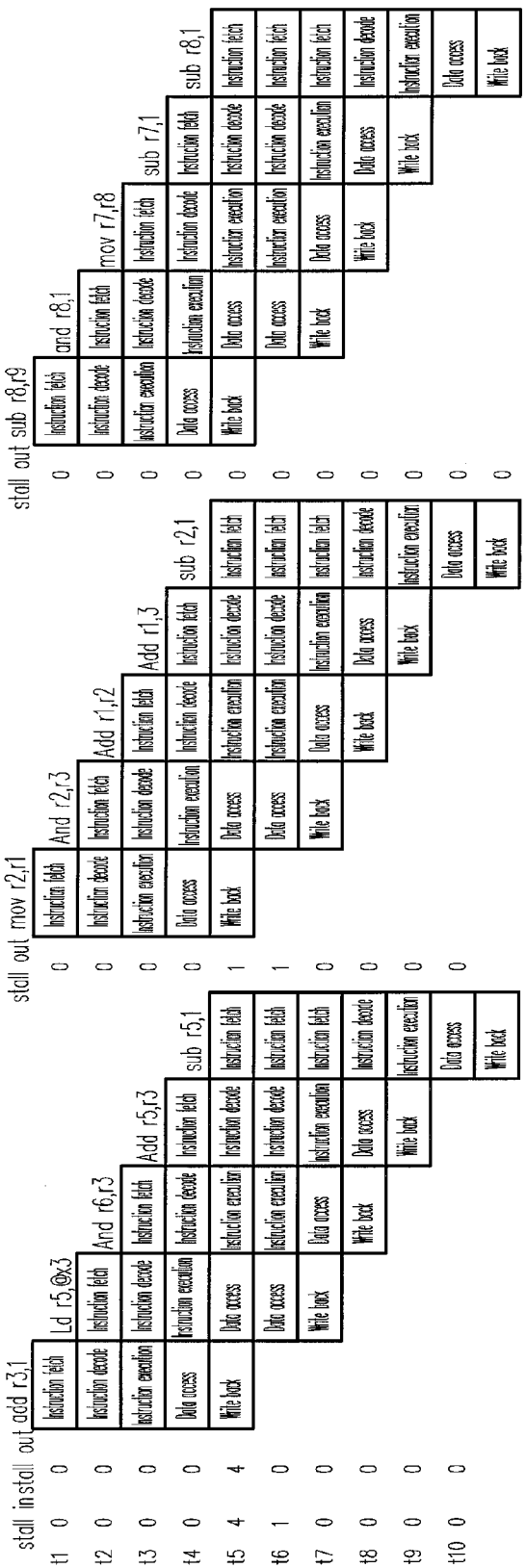
FIG. 10E is another schematic diagram illustrating a situation that a pipeline processing apparatus processes an unexpected stall.

Referring to FIG. 10E, during the time cycle t5, a data access stall is occurred when the instruction LD r5, @x3 of the processing unit PU1 read data (data is not ready), so that the processing unit PU1 sends a stall request of the data access (4) pipeline stage to the instruction synchronization control circuit by outputting the stall-output signal Stall_Out of 4. During the same time cycle t5, since the processing unit PU2 is failed to opportunely obtain a required instruction Sub r2, 1 from the memory, the processing unit PU2 sends a stall request of the instruction fetch (1) pipeline stage to the instruction synchronization control circuit by outputting the stall-output signal Stall_Out of 1. Therefore, during this cycle, the stall-output signals Stall_Out of the processing units PU1, PU2 and PU3 are respectively 4, 1, 0. The instruction synchronization control circuit obtains information that the instruction synchronization of the processing units PU1, PU2 and PU3 has to be achieved according to the setting of the configuration memory, and determines to output 4 to the stall-in signals Stall_In of the three instruction synchronous processing units according to a fact that the last pipeline stage of the three instruction synchronous processing units wherein the stall is occurred is 4, so as to request the processing units PU1, PU2 and PU3 to simultaneously stall the instruction fetch (1), the instruction decode (2), the instruction execution (3) and the data access (4) pipeline stages. Then, during the time cycle t6, the instruction Ld r5, @x3 of the processing unit PU1 completes reading the data, so that the stall-output signal Stall_Out of the processing unit PU1 is 0, though the processing unit PU2 is still failed to obtain the required instruction Sub r2, 1, so that the stall-output signal Stall_Out of the processing unit PU1 is still 1, and the stall-output signals Stall_Out of the processing units PU1, PU2 and PU3 are respectively 0, 1, 0. The instruction synchronization control circuit obtains information that the instruction synchronization of the processing units PU1, PU2 and PU3 has to be achieved according to the setting of the configuration memory, and determines to output 1 to the stall-in signals Stall_In of the three instruction synchronous processing units according to a fact that the last pipeline stage of the three instruction synchronous processing units wherein the stall is occurred is 1, so as to request the processing units PU1, PU2 and PU3 to simultaneously stall the instruction fetch (1) pipeline stages. During the time cycle t7, the processing units PU2 read the required instruction Sub r2, 1, so that the stall-output signal Stall_Out of the processing unit PU2 is 0. The instruction synchronization control circuit determines to output 0 to the stall-in signals Stall_In of the three processing units to release the stall request of the pipeline stages of the processing units PU1, PU2 and PU3 due to that the stall-output signals Stall_Out of the processing units PU1, PU2 and PU3 are respectively 0, 0, 0 (i.e. no stall is occurred to any pipeline stage of the three instruction synchronous processing units), so that the processing units PU1, PU2 and PU3 simultaneously end the suspension states and continually execute the instructions. Similarly, the stalled pipeline stages can still carry on their tasks, though the execution results thereof cannot be delivered to the following pipeline stages during this cycle. According to such stall control, the pipeline stage timings of the processing units PU1, PU2 and PU3 are maintained consistent, so that the instruction synchronization of the processing units PU1, PU2 and PU3 is achieved.

Figure 10F:
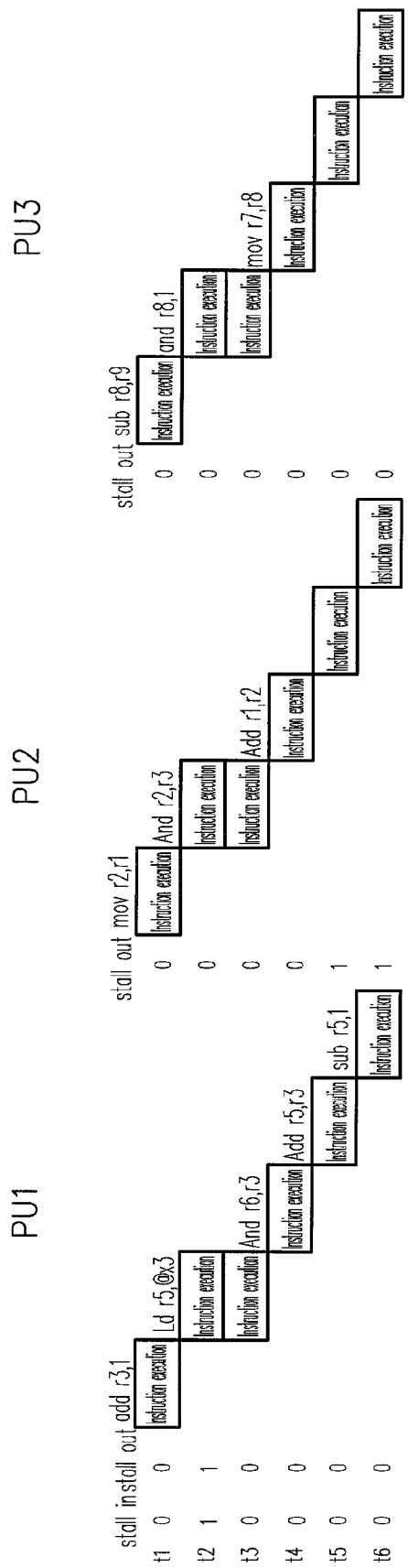
FIG. 10F is a schematic diagram illustrating a situation that a non-pipeline processing apparatus processes an unexpected stall.

In an example of FIG. 10F, the instruction synchronization of the processing units PU1, PU2 and PU3 is achieved according to the setting of the configuration memory, and each of the processing unit has a non-pipeline structure. Only when each of the instructions is completely executed by the processing unit, can the processing unit fetch a next instruction for executing. A duration required from the instruction fetch to completion of the instruction execution can be one or a plurality of clock cycles, which is referred to as an instruction cycle. In the example of FIG. 10F, one time cycle is one instruction cycle, which is necessarily to be one clock cycle, and in case of none stall is occurred, the instruction cycles of the processing units are synchronous. The stall-output signal Stall_Out of each processing unit records whether such processing unit is stalled at this instruction cycle. For example, if the processing unit is stalled at this instruction cycle, the stall-output signal Stall_Out is 1, and if the processing unit is not stalled at this instruction cycle, the stall-output signal Stall_Out is 0. The stall-in signal Stall_In of each processing unit indicates that the processing unit has to stall completing the instruction at such instruction cycle. Here, the stall of the pipeline stage of the processing unit refers to that the processing unit cannot write an execution result to a register, though an executing and effective task of the processing unit can still be carried on. Moreover, in the following example, the registers r0-r15 are belonged to the shared resource registers, and since the pipeline structure does not exist, the hazard is not occurred, and the data forwarding is not required. Such example can be regarded as a special case of the processing unit with multiple stages when the structure the processing unit has a single stage, so that the aforementioned structure and mechanism are still applicable.

Referring to FIG. 10F, during the time cycle t2, since a data access stall is occurred when the instruction LD r5, @x3 of the processing unit PU1 read data (data is not ready), or an instruction fetch stall is occurred (the instruction is not ready), the processing unit PU1 sends a stall request to the instruction synchronization control circuit by outputting the stall-output signal Stall_Out of 1. Therefore, during this cycle, the stall-output signals Stall_Out of the processing units PU1, PU2 and PU3 are respectively 1, 0, 0. The instruction synchronization control circuit obtains information that the instruction synchronization of the processing units PU1, PU2 and PU3 has to be achieved according to the setting of the configuration memory, and determines to output 1 to the stall-in signals Stall_In of the three instruction synchronous processing units according to whether the stall is occurred to any of the three instruction synchronous processing units, so as to request the processing units PU1, PU2 and PU3 to simultaneously stall completing the instructions. Now, the stalled pipeline stages can still carry on their tasks, though the execution results thereof cannot be written back to the target register during this cycle. According to such stall control, the execution sequence of the processing units PU1, PU2 and PU3 are maintained consistent, so that the instruction synchronization of the processing units PU1, PU2 and PU3 is achieved. During the time cycle t3, the data or the instruction to be read by the processing unit PU1 is ready, and the processing unit PU1 obtains the required data or the instruction, so that the processing unit PU1 changes the stall-output signal Stall_Out to 0, which represents that the processing unit PU1 does not require the stall request. Therefore, the instruction synchronization control circuit determines to output 0 to the stall-in signals Stall_In of the three processing units to release the stall request of the processing units PU1, PU2 and PU3 due to that the stall-output signals Stall_Out of the processing units PU1, PU2 and PU3 are respectively 0, 0, 0 (i.e. no stall is occurred to the three instruction synchronous processing units), so that the processing units PU1, PU2 and PU3 simultaneously end the suspension states and continually execute the instructions.

Moreover, it should be noticed that the configurable processing apparatus can be applied to various processing systems, for example, a personal computer, a notebook computer, a terminal server or a smart phone, etc., though application of the configurable processing apparatus is not limited thereto. In addition, the configurable processing system using the configurable processing apparatus may have the configurable processing apparatus, a motherboard, a hard disk and a memory, etc., wherein the motherboard has a processing apparatus socket, and the configurable processing apparatus can be installed in the processing apparatus socket, i.e. the configurable processing apparatus is a pluggable processing apparatus.

In summary, the configurable processing apparatus of the present disclosure may simultaneously have a plurality of different modes, so that instruction synchronization or independent of the corresponding processing units can be achieved by presetting or dynamically setting the configuration memory. Therefore, the configurable processing apparatus has a better adaptability, in which the configuration is dynamically determined according to a type and a work division mode of the application program or subroutine, so as to obtain a better execution performance.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A configurable processing apparatus, comprising:
a plurality of single data single instruction processing units, each processing unit having at least a stall-output signal generating circuit to output at least a stall-output signal, wherein the stall-output signal indicates that an unexpected stall occurred in the processing unit, the processing unit further receives at least a stall-in signal, and the stall-in signal is used to control whether the processing unit is to be stalled for at least one instruction until an unexpected stall has ended; and
at least an instruction synchronization control circuit, and at least a configuration memory, the instruction synchronization control circuit receiving the stall-output signals, and generating the stall-in signals in response to a first content comprising a group tag which records a group number to indicate simultaneous stalling for all processing units in a same group and a shared instruction flag which records whether a processing unit shares an instruction with the same group, stored in the configuration memory and the stall-output signals of the processing units.

2. The configurable processing apparatus as claimed in claim 1, wherein the configuration memory is at least a non-volatile or a volatile random access memory (RAM), or at least a mask read-only memory (ROM).

3. The configurable processing apparatus as claimed in claim 2, wherein a content of the non-volatile or the volatile RAM is set as a plurality of initial values.

4. The configurable processing apparatus as claimed in claim 1, wherein the instruction synchronization control circuits and the configuration memories are concentrated or dispersed in the configurable processing apparatus.

5. The configurable processing apparatus as claimed in claim 1, wherein the processing unit is capable of accessing the configuration memory.

6. The configurable processing apparatus as claimed in claim 1, wherein the processing unit designated as instruction synchronization by the configuration memory is capable of setting at least an instruction share circuit of the configurable processing apparatus according to a second content in the configuration memory, so as to determine whether the processing unit fetches an instruction by itself or shares a fetched instruction.

7. The configurable processing apparatus as claimed in claim 1, wherein each of the processing units is a non-pipeline structure processing unit, each of the stall-output signals recodes whether an unexpected stall is occurred to the corresponding processing unit, each of the stall-in signals indicates whether the corresponding processing unit has to be stalled, and the instruction synchronization control circuit generates the stall-in signals in response to the first content stored in the configuration memory and the stall-output signals of the processing units.

8. The configurable processing apparatus as claimed in claim 1, wherein each of the processing units is a pipeline structure processing unit, each of the stall-output signals recodes a last pipeline stage of the corresponding processing unit where the stall is occurred, each of the stall-in signals indicates the recorded pipeline stage and the previous pipeline stages of the corresponding processing unit have to be stalled, and the instruction synchronization control circuit generates the stall-in signals in response to the first content stored in the configuration memory and the stall-output signals of the processing units.

9. The configurable processing apparatus as claimed in claim 8, wherein the instruction synchronization control circuit controls the processing units required to be synchronous to stall the last pipeline stages and the previous pipeline stages thereof according to the first content stored in the configuration memory and the last pipeline stages recorded by the stall-output signals of the processing units having the instruction synchronization.

10. The configurable processing apparatus of claim 1, wherein the first content stored in the configuration memory further comprises a shared instruction flag for each of the processing units, and each shared instruction flag records whether the corresponding processing unit shares an instruction fetched by a previous processing unit or fetches the instruction by itself.

11. The configurable processing apparatus of claim 1, wherein stall-out signals indicate at least the stages in a pipeline.

12. A configurable processing system, comprising:
a configurable processing apparatus, comprising:
  a plurality of single data single instruction processing units, each processing unit having at least a stall-output signal generating circuit to output at least a stall-output signal, wherein the stall-output signal indicates that an unexpected stall occurred in the processing unit, the processing unit further receives at least a stall-in signal, and the stall-in signal is used to control whether the processing unit is to be stalled for at least one instruction until an unexpected stall has ended; and
  at least an instruction synchronization control circuit, and at least a configuration memory, the instruction synchronization control circuit receiving the stall-output signals, and generating the stall-in signals in response to a first content comprising a group tag which records a group number to indicate simultaneous stalling for all processing units in a same group and a shared instruction flag which records whether a processing unit shares an instruction with the same group, stored in the configuration memory and the stall-output signals of the processing units.

13. The configurable processing system as claimed in claim 12, wherein the configuration memory is at least a non-volatile or a volatile random access memory (RAM), or at least a mask read-only memory (ROM).

14. The configurable processing system as claimed in claim 13, wherein a content of the non-volatile or the volatile RAM is set as a plurality of initial values.

15. The configurable processing system as claimed in claim 12, wherein the instruction synchronization control circuits and the configuration memories are concentrated or dispersed in the configurable processing apparatus.

16. The configurable processing system as claimed in claim 12, wherein the processing unit is capable of accessing the configuration memory.

17. The configurable processing system as claimed in claim 12, wherein the processing unit designated as instruction synchronization by the configuration memory is capable of setting at least an instruction share circuit of the configurable processing apparatus according to a second content in the configuration memory, so as to determine whether the processing unit fetches an instruction by itself or shares a fetched instruction.

18. The configurable processing system as claimed in claim 12, wherein each of the processing units is a non-pipeline structure processing unit, each of the stall-output signals recodes whether an unexpected stall is occurred to the corresponding processing unit, each of the stall-in signals indicates whether the corresponding processing unit has to be stalled, and the instruction synchronization control circuit generates the stall-in signals in response to the first content stored in the configuration memory and the stall-output signals of the processing units.

19. The configurable processing system as claimed in claim 12, wherein each of the processing units is a pipeline structure processing unit, each of the stall-output signals recodes a last pipeline stage of the corresponding processing unit where the stall is occurred, each of the stall-in signals indicates the recorded pipeline stage and the previous pipeline stages of the corresponding processing unit have to be stalled, and the instruction synchronization control circuit generates the stall-in signals in response to the first content stored in the configuration memory and the stall-output signals of the processing units.

20. The configurable processing system as claimed in claim 19, wherein the instruction synchronization control circuit controls the processing units required to be synchronous to stall the last pipeline stages and the previous pipeline stages thereof according to the first content stored in the configuration memory and the last pipeline stages recorded by the stall-output signals of the processing units having the instruction synchronization.

21. The configurable processing system as claimed in claim 12, wherein configurable processing system comprises a socket.

* * * * *